United States Patent
Chujoh et al.

(10) Patent No.: US 12,177,490 B2
(45) Date of Patent: Dec. 24, 2024

(54) VIDEO CODING APPARATUS AND VIDEO DECODING APPARATUS

(71) Applicant: Sharp Kabushiki Kaisha, Sakai (JP)

(72) Inventors: Takeshi Chujoh, Sakai (JP); Tomohiro Ikai, Sakai (JP); Yukinobu Yasugi, Sakai (JP); Yasuaki Tokumo, Sakai (JP); Tomonori Hashimoto, Sakai (JP); Tomoko Aono, Sakai (JP); Keiichiro Takada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 123 days.

(21) Appl. No.: 18/132,640

(22) Filed: Apr. 10, 2023

(65) Prior Publication Data
US 2023/0328292 A1    Oct. 12, 2023

(30) Foreign Application Priority Data
Apr. 11, 2022    (JP) .................................. 2022-065065

(51) Int. Cl.
  H04N 19/80    (2014.01)
  H04N 19/172   (2014.01)
  H04N 19/85    (2014.01)

(52) U.S. Cl.
  CPC .......... *H04N 19/80* (2014.11); *H04N 19/172* (2014.11); *H04N 19/85* (2014.11)

(58) Field of Classification Search
  CPC ...... H04N 19/80; H04N 19/172; H04N 19/85; H04N 19/117; H04N 19/176; H04N 19/70; H04N 19/59
  (Continued)

(56) References Cited

U.S. PATENT DOCUMENTS

| | | | | |
|---|---|---|---|---|
| 5,245,427 A | * | 9/1993 | Kunihiro | H04N 19/192 375/E7.176 |
| 2018/0020241 A1 | * | 1/2018 | Li | H04N 19/13 |

(Continued)

OTHER PUBLICATIONS

Hannuksela et al., "AHG9: On post-filter SEI", Joint Video Experts Team (JVET) of ITU-T SG 16 WP 3 and ISO/IEC ITC 1/SC 29, JVET-Y0115-v1, Jan. 12-21, 2022, pp. 1-7.
(Continued)

*Primary Examiner* — Tung T Vo
(74) *Attorney, Agent, or Firm* — Keating & Bennett, LLP

(57) ABSTRACT

Object
There is the problem in the related art that the relationship between a patch size which is a unit of processing of a neural network and the sizes of input and output pictures is not clearly defined.
Solution
A video decoding apparatus for generating a decoded picture by decoding coded data, the video decoding apparatus comprising:
  resolution inverse conversion circuit that performs a post-filtering by using a neural network specified by resolution conversion information; and
  neural network filter circuit that derives:
  (i) first information relating to a size of a picture,
  (ii) second information specifying a size of a picture resulting from applying the post-filtering,
  (iii) third information indicating a patch size for the post-filtering, and
  (iv) fourth information for output patch derived by using the third information, (Continued)

wherein
a product of a value of the first information and a value of the fourth information is equal to a product of a value of the second information and a value of the third information.

3 Claims, 20 Drawing Sheets

(58) Field of Classification Search
USPC .................................................. 375/240.26
See application file for complete search history.

(56) References Cited

U.S. PATENT DOCUMENTS

2022/0159298 A1\* 5/2022 Boyce ................... H04N 19/70
2022/0256227 A1\* 8/2022 Rezazadegan Tavakoli ...............
                                                          H04N 19/70
2022/0286691 A1\* 9/2022 Choi ..................... H04N 19/13
2022/0394308 A1\* 12/2022 Li .......................... H04N 19/82
2023/0007246 A1\* 1/2023 Li ............................ G06N 3/04
2023/0112309 A1\* 4/2023 Hannuksela ......... H04N 19/184
                                                          375/240.29

OTHER PUBLICATIONS

Tannuksela et al., "AHG9: On post-filter SEI", Joint Video Experts Team (JVET) of ITU-T SG 16 WP 3 and ISO/IEC ITC 1/SC 29, JVET-X0112-v1, Oct. 6-15, 2021, pp. 1-5.

Choi et al., "AHG9/AHG11: SEI messages for carriage of neural network information for post-filtering", Joint Video Experts Team (JVET) of ITU-T SG 16 WP 3 and ISO/IEC JTC 1/SC 29, JVET-V0091-v2, Apr. 20-28, 2021, pp. 1-15.

\* cited by examiner

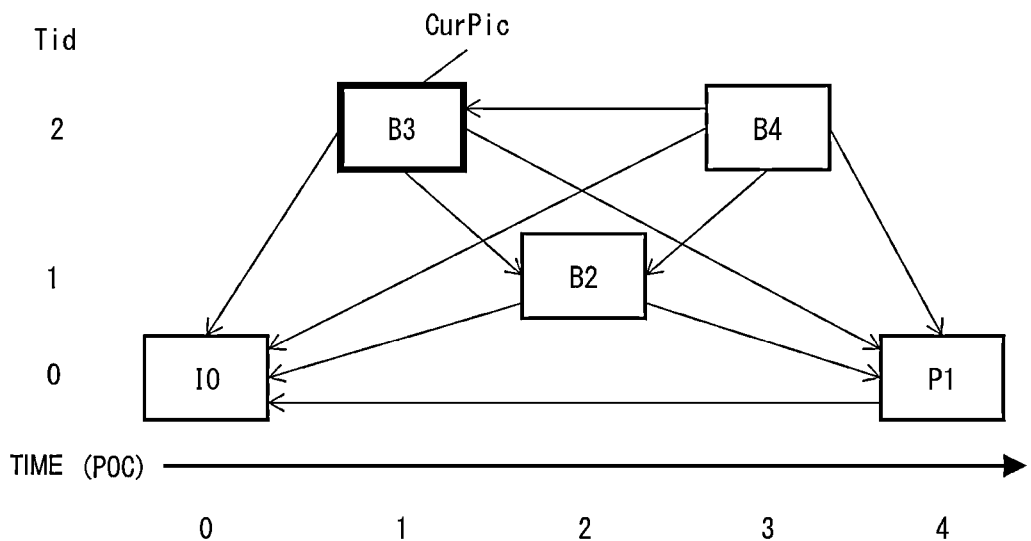
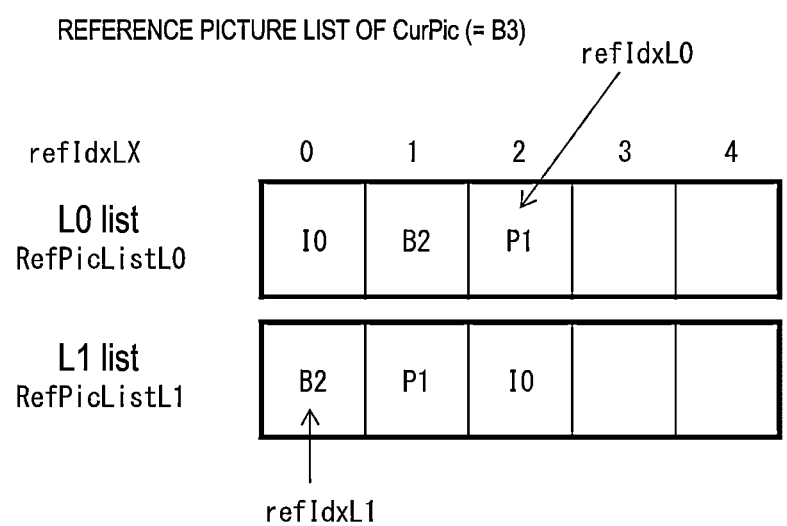
FIG. 4

| nnr_post_filter( payloadSize ) { | Descriptor |
|---|---|
|   nnrpf_id | u(21) |
|   nnrpf_mode_idc | u(2) |
|   if( nnrpf_mode_idc > 0 ) { | |
|     nnrpf_persistence_flag | u(1) |
|     if( nnrpf_mode_idc == 1 \|\| nnrpf_mode_idc == 2 ) { | |
|       nnrpf_purpose | ue(v) |
|       nnrpf_out_sub_width_c_idc | u(2) |
|       nnrpf_pic_width_in_luma_samples | ue(v) |
|       nnrpf_pic_height_in_luma_samples | ue(v) |
|       nnrpf_io_order_idc | ue(v) |
|       nnrpf_patch_size_minus1 | ue(v) |
|       nnrpf_overlap | ue(v) |
|       nnrpf_complexity_idc | ue(v) |
|       if( nnrpf_complexity_idc > 0 ) { | |
|         nnrpf_complexity_element( nnrpf_complexity_idc ) | |
|       } | |
|       while( !byte_aligned( ) ) | |
|         nnrpf_reserved_zero_bit | u(1) |
|     } | |
|     if( nnrpf_mode_idc == 1 ) { | |
|       i = 0 | |
|       do | |
|         nnrpf_uri[ i ] | b(8) |
|       while( nnrpf_uri[ i++ ] != 0 ) | |
|     } | |
|     if( nnrpf_mode_idc == 2 \|\| nnrpf_mode_idc == 3 ) { | |
|       for( i = 0; more_data_in_payload( ); i++ ) | |
|         nnrpf_payload_byte[ i ] | b(8) |
|     } | |
|   } | |
| } | |

FIG. 9

```
if( nnrpf_io_order_idc == 0 )
    for( cTop = 0; cTop < PicHeightInLumaSamples; cTop += patchHeight )
        for( cLeft = 0; cLeft < PicWidthInLumaSamples; cLeft += patchWidth ) {
            InputTensors( )
            outputTensor = PostProcessingFilter( inputTensor )
            OutputTensors( )
        }
else if( nnrpf_io_order_idc == 1 )
    for( cTop = 0; cTop < PicHeightInLumaSamples / InpSubHeightC; cTop += patchHeight )
        for( cLeft = 0; cLeft < PicWidthInLumaSamples / InpSubWidthC; cLeft += patchWidth ) {
            InputTensors( )
            outputTensor = PostProcessingFilter( inputTensor )
            OutputTensors( )
        }
else if( nnrpf_io_order_idc == 2 ) {
    for( cTop = 0; cTop < PicHeightInLumaSamples; cTop += patchHeight)
        for( cLeft = 0; cLeft < PicWidthInLumaSamples; cLeft += patchWidth) {
            InputTensors( )
            outputTensor = PostProcessingFilter( inputTensor )
            OutputTensors( )
        }
}
else if( nnrpf_io_order_idc == 3 )
    for( cTop = 0; cTop < PicHeightInLumaSamples; cTop += patchHeight * 2 )
        for( cLeft = 0; cLeft < PicWidthInLumaSamples; cLeft += patchWidth * 2 ) {
            InputTensors( )
            outputTensor = PostProcessingFilter( inputTensor )
            OutputTensors( )
        }
}
```

FIG. 10

| nnrpf_io_order_idc | InputTensors( ) |
|---|---|
| 0 | ```for ( yP = −overlapSize; yP < patchHeight + overlapSize; yP++)
    for ( xP = −overlapSize; xP < patchWidth + overlapSize; xP++ ) {
        y = Clip3( 0, PicHeightInLumaSamples − 1, cTop + yP )
        x = Clip3( 0, PicWidthtInLumaSamples − 1, cLeft + xP )
        inputTensor[ 0 ][ 0 ][ yP + overlapSize ][ xP + overlapSize ] = InpY( CroppedYPic[ y ][ x ] )
    }``` |
| 1 | ```for ( yP = −overlapSize; yP < patchHeight + overlapSize; yP++)
    for ( xP = −overlapSize; xP < patchWidth + overlapSize; xP++ ) {
        y = Clip3( 0, PicHeightInLumaSamples / InpSubHeightC − 1, cTop + yP )
        x = Clip3( 0, PicWidthtInLumaSamples / InpSubWidthC − 1, cLeft + xP )
        inputTensor[ 0 ][ 0 ][ yP + overlapSize ][ xP + overlapSize ] = InpC( CroppedCbPic[ y ][ x ] )
        inputTensor[ 0 ][ 1 ][ yP + overlapSize ][ xP + overlapSize ] = InpC( CroppedCrPic[ y ][ x ] )
    }``` |
| 2 | ```for ( yP = −overlapSize; yP < patchHeight + overlapSize; yP++)
    for ( xP = −overlapSize; xP < patchWidth + overlapSize; xP++ ) {
        yY = Clip3( 0, PicHeightInLumaSamples − 1, cTop + yP )
        xY = Clip3( 0, PicWidthtInLumaSamples − 1, cLeft + xP )
        yC = yY / InpSubHeightC
        xC = xY / InpSubWidthC
        inputTensor[ 0 ][ 0 ][ yP + overlapSize ][ xP + overlapSize ] = InpY( CroppedYPic[ yY ][ xY ] )
        inputTensor[ 0 ][ 1 ][ yP + overlapSize ][ xP + overlapSize ] = InpC( CroppedCbPic[ yC ][ xC ] )
        inputTensor[ 0 ][ 2 ][ yP + overlapSize ][ xP + overlapSize ] = InpC( CroppedCrPic[ yC ][ xC ] )
    }``` |
| 3 | ```for ( yP = −overlapSize; yP < patchHeight + overlapSize; yP++)
    for ( xP = −overlapSize; xP < patchWidth + overlapSize; xP++ ) {
        yTL = Clip3( 0, PicHeightInLumaSamples − 1, cTop + yP * 2 )
        xTL = Clip3( 0, PicWidthtInLumaSamples − 1, cLeft + xP * 2 )
        yBR = Clip3( 0, PicHeightInLumaSamples − 1, yTL + 1 )
        xBR = Clip3( 0, PicWidthtInLumaSamples − 1, xTL + 1 )
        y = Clip3( 0, PicHeightInLumaSamples / 2 − 1, cTop / 2 )
        x = Clip3( 0, PicWidthtInLumaSamples / 2 − 1, cLeft / 2 )
        inputTensor[ 0 ][ 0 ][ yP + overlapSize ][ xP + overlapSize ] = InpY( CroppedYPic[ yTL ][ xTL ] )
        inputTensor[ 0 ][ 1 ][ yP + overlapSize ][ xP + overlapSize ] = InpY( CroppedYPic[ yTL ][ xBR ] )
        inputTensor[ 0 ][ 2 ][ yP + overlapSize ][ xP + overlapSize ] = InpY( CroppedYPic[ yBR ][ xTL ] )
        inputTensor[ 0 ][ 3 ][ yP + overlapSize ][ xP + overlapSize ] = InpY( CroppedYPic[ yBR ][ xBR ] )
        inputTensor[ 0 ][ 4 ][ yP + overlapSize ][ xP + overlapSize ] = InpC( CroppedCbPic[ y ][ x ] )
        inputTensor[ 0 ][ 5 ][ yP + overlapSize ][ xP + overlapSize ] = InpC( CroppedCrPic[ y ][ x ] )
        inputTensor[ 0 ][ 6 ][ yP + overlapSize ][ xP + overlapSize ] = $2^{(SliceQPY − 42)/6}$
    }``` |
| 4..255 | reserved |

FIG. 11

| nnrpf_io_order_idc | OutputTensors( ) |
|---|---|
| 0 | ```
for ( yP = 0; yP < outPatchHeight; yP++)
    for ( xP = 0; xP < outPatchWidth; xP++ ) {
        yY = cTop * outPatchHeight / patchHeight + yP
        xY = cLeft * outPatchTensorWidth / patchWidth + xP
        if ( yY < nnrpf_pic_height_in_luma_samples && xY < nnrpf_pic_width_in_luma_samples)
            FilteredYPic[yY][ xY ] = OutY( outputTensor[ 0 ][ 0 ][ yP ][ xP ] )
    }
``` |
| 1 | ```
for ( yP = 0; yP < outPatchCHeight; yP++)
    for ( xP = 0; xP < outPatchCWidth; xP++ ) {
        ySrc = cTop * InpSubHightC / outSubHightC + yP
        xSrc = cLeft *InpSubWidthC / outSubWidthC + xP
        if ( ySrc < nnrpf_pic_height_in_luma_samples / outSubHeightC &&
            xSrc < nnrpf_pic_width_in_luma_samples / outSubWidthC ) {
            FilteredCbPic[ ySrc ][ xSrc ] = OutC( outputTensor[ 0 ][ 0 ][ yP ][ xP ] )
            FilteredCrPic[ ySrc ][ xSrc ] = OutC( outputTensor[ 0 ][ 1 ][ yP ][ xP ] )
        }
    }
``` |
| 2 | ```
for ( yP = 0; yP < outPatchHeight; yP++)
    for ( xP = 0; xP < outPatchWidth; xP++ ) {
        yY = cTop * outPatchHeight / patchHeight + yP
        xY = cLeft * outPatchWidth / patchWidth + xP
        yC = yY / outSubHeightC
        xC = xY / outSubWidthC
        yPc = ( yP / outSubHeightC ) * outSubHeightC
        xPc = ( xP / outSubWidthC ) * outtSubWidthC
        if ( yY < nnrpf_pic_height_in_luma_samples && xY < nnrpf_pic_width_in_luma_samples) {
            FilteredYPic[ yY ][ xY ] = OutY( outputTensor[ 0 ][ 0 ][ yP ][ xP ] )
            FilteredCbPic[ yC ][ xC ] = OutC( outputTensor[ 0 ][ 1 ][ yPc ][ xPc ] )
            FilteredCrPic[ yC ][ xC ] = OutC( outputTensor[ 0 ][ 2 ][ yPc ][ xPc ] )
        }
    }
``` |
| 3 | ```
for( yP = 0; yP < patchHeight; yP++ )
    for( xP = 0; xP < patchWidth; xP++ ) {
        ySrc = (cTop / 2) * outPatchHeight / patchHeight + yP
        xSrc = (cLeft / 2) * outPatchWidth / patchWidth + xP
        if ( ySrc < nnrpf_pic_height_in_luma_samples / 2 && xSrc < nnrpf_pic_width_in_luma_samples) {
            FilteredYPic[ ySrc * 2 ][ xSrc * 2 ] = OutY( outputTensor[ 0 ][ 0 ][ yP ][ xP ] )
            FilteredYPic[ ySrc * 2 ][ xSrc * 2 + 1 ] = OutY( outputTensor[ 0 ][ 1 ][ yP ][ xP ] )
            FilteredYPic[ ySrc * 2 + 1 ][ xSrc * 2 ] = OutY( outputTensor[ 0 ][ 2 ][ yP ][ xP ] )
            FilteredYPic[ ySrc * 2 + 1 ][ xSrc * 2 + 1] = OutY( outputTensor[ 0 ][ 3 ][ yP ][ xP ] )
            FilteredCbPic[ ySrc ][ xSrc ] = OutC( outputTensor[ 0 ][ 4 ][ yP ][ xP ] )
            FilteredCrPic[ ySrc ][ xSrc ] = OutC( outputTensor[ 0 ][ 5 ][ yP ][ xP ] )
        }
    }
``` |
| 4..255 | reserved |

FIG. 12

| nnr_post_filter( payloadSize ) { | Descriptor |
|---|---|
|   nnrpf_id | u(21) |
|   nnrpf_mode_idc | u(2) |
|   if( nnrpf_mode_idc > 0 ) { | |
|     nnrpf_persistence_flag | u(1) |
|     if( nnrpf_mode_idc == 1 \|\| nnrpf_mode_idc == 2 ) { | |
|       nnrpf_purpose | ue(v) |
|       if( nnrpf_purpose == 1 ) { | |
|         nnrpf_out_sub_width_c_flag | u(1) |
|         nnrpf_out_sub_height_c_flag | u(1) |
|       } | |
|       nnrpf_pic_width_in_luma_samples | ue(v) |
|       nnrpf_pic_height_in_luma_samples | ue(v) |
|       nnrpf_component_last_flag | u(1) |
|       nnrpf_inp_sample_idc | ue(v) |
|       if( nnrpf_inp_sample_idc >= 5 && nnrpf_inp_sample_idc <= 6 ) { | |
|         nnrpf_inp_tensor_bitdepth_minus8 | ue(v) |
|       } | |
|       nnrpf_inp_order_idc | ue(v) |
|       nnrpf_out_sample_idc | ue(v) |
|       if( nnrpf_out_sample_idc >= 5 && nnrpf_out_sample_idc <= 6 ) { | |
|         nnrpf_out_tensor_bitdepth_minus8 | ue(v) |
|       } | |
|       nnrpf_out_order_idc | ue(v) |
|       nnrpf_constant_patch_size_flag | u(1) |
|       if( nnrpf_constant_patch_size_flag ) { | |
|         nnrpf_patch_width_minus1 | ue(v) |
|         nnrpf_patch_height_minus1 | ue(v) |
|       } | |
|       do | |
|         nnrpf_uri[ i ] | b(8) |
|       while( nnrpf_uri[ i++ ] != 0 ) | |
|     } | |
|     if( nnrpf_mode_idc == 2 \|\| nnrpf_mode_idc == 3 ) { | |
|       for( i = 0; more_data_in_payload( ); i++ ) | |
|         nnrpf_payload_byte[ i ] | b(8) |
|     } | |
|   } | |
| } | |

FIG. 13

| nnr_post_filter( payloadSize ) { | Descriptor |
|---|---|
|   nnrpf_id | u(21) |
|   nnrpf_mode_idc | u(2) |
|   if( nnrpf_mode_idc > 0 ) { | |
|     nnrpf_persistence_flag | u(1) |
|     if( nnrpf_mode_idc == 1 \|\| nnrpf_mode_idc == 2 ) { | |
|       nnrpf_purpose | ue(v) |
|       if( nnrpf_purpose == 1 ) { | |
|         nnrpf_out_sub_width_c_flag | u(1) |
|         nnrpf_out_sub_height_c_flag | u(1) |
|       } | |
|       nnrpf_pic_width_in_luma_samples | ue(v) |
|       nnrpf_pic_height_in_luma_samples | ue(v) |
|       nnrpf_component_last_flag | u(1) |
|       nnrpf_inp_sample_idc | ue(v) |
|       if( nnrpf_inp_sample_idc >= 4 && nnrpf_inp_sample_idc <= 6 ) { | |
|         nnrpf_inp_tensor_bitdepth_delta | ue(v) |
|       } | |
|       nnrpf_inp_order_idc | ue(v) |
|       nnrpf_out_sample_idc | ue(v) |
|       if( nnrpf_out_sample_idc >= 4 && nnrpf_out_sample_idc <= 6 ) { | |
|         nnrpf_out_tensor_bitdepth_delta | ue(v) |
|       } | |
|       nnrpf_out_order_idc | ue(v) |
|       nnrpf_constant_patch_size_flag | u(1) |
|       if( nnrpf_constant_patch_size_flag ) { | |
|         nnrpf_patch_width_minus1 | ue(v) |
|         nnrpf_patch_height_minus1 | ue(v) |
|       } | |
|       do | |
|         nnrpf_uri[ i ] | b(8) |
|       while( nnrpf_uri[ i++ ] != 0 ) | |
|     } | |
|     if( nnrpf_mode_idc == 2 \|\| nnrpf_mode_idc == 3 ) { | |
|       for( i = 0; more_data_in_payload( ); i++ ) | |
|         nnrpf_payload_byte[ i ] | b(8) |
|     } | |
|   } | |
| } | |

FIG. 14

| nnr_post_filter( payloadSize ) { | Descriptor |
|---|---|
|   nnrpf_id | u(21) |
|   nnrpf_mode_idc | u(2) |
|   if( nnrpf_mode_idc > 0 ) { | |
|     nnrpf_persistence_flag | u(1) |
|     if( nnrpf_mode_idc == 1 \|\| nnrpf_mode_idc == 2 ) { | |
|       nnrpf_purpose | ue(v) |
|       if( nnrpf_purpose == 1 ) { | |
|         nnrpf_out_sub_width_c_flag | u(1) |
|         nnrpf_out_sub_height_c_flag | u(1) |
|       } | |
|       nnrpf_pic_width_in_luma_samples | ue(v) |
|       nnrpf_pic_height_in_luma_samples | ue(v) |
|       nnrpf_component_last_flag | u(1) |
|       nnrpf_inp_sample_idc | ue(v) |
|       if( nnrpf_inp_sample_idc >= 5 && nnrpf_inp_sample_idc <= 6 ) { | |
|         nnrpf_inp_tensor_bitdepth_luma_minus8 | ue(v) |
|         nnrpf_inp_tensor_bitdepth_chroma_minus8 | ue(v) |
|       } | |
|       nnrpf_inp_order_idc | ue(v) |
|       nnrpf_out_sample_idc | ue(v) |
|       if( nnrpf_out_sample_idc >= 5 && nnrpf_out_sample_idc <= 6 ) { | |
|         nnrpf_out_tensor_bitdepth_luma_minus8 | ue(v) |
|         nnrpf_out_tensor_bitdepth_chroma_minus8 | ue(v) |
|       } | |
|       nnrpf_out_order_idc | ue(v) |
|       nnrpf_constant_patch_size_flag | u(1) |
|       if( nnrpf_constant_patch_size_flag ) { | |
|         nnrpf_patch_width_minus1 | ue(v) |
|         nnrpf_patch_height_minus1 | ue(v) |
|       } | |
|       do | |
|         nnrpf_uri[ i ] | b(8) |
|       while( nnrpf_uri[ i++ ] != 0 ) | |
|     } | |
|     if( nnrpf_mode_idc == 2 \|\| nnrpf_mode_idc == 3 ) { | |
|       for( i = 0; more_data_in_payload( ); i++ ) | |
|         nnrpf_payload_byte[ i ] | b(8) |
|     } | |
|   } | |
| } | |

FIG. 15

| nnr_post_filter( payloadSize ) { | Descriptor |
|---|---|
|   nnrpf_id | u(21) |
|   nnrpf_mode_idc | u(2) |
|   if( nnrpf_mode_idc > 0 ) { | |
|     nnrpf_persistence_flag | u(1) |
|     if( nnrpf_mode_idc == 1 \|\| nnrpf_mode_idc == 2 ) { | |
|       nnrpf_purpose | ue(v) |
|       if( nnrpf_purpose == 1 ) { | |
|         nnrpf_out_sub_width_c_flag | u(1) |
|         nnrpf_out_sub_height_c_flag | u(1) |
|       } | |
|       nnrpf_pic_width_in_luma_samples | ue(v) |
|       nnrpf_pic_height_in_luma_samples | ue(v) |
|       nnrpf_component_last_flag | u(1) |
|       nnrpf_sample_idc | ue(v) |
|       if( nnrpf_sample_idc >= 5 && nnrpf_sample_idc <= 6 ) { | |
|         nnrpf_tensor_bitdepth_minus8 | ue(v) |
|       } | |
|       nnrpf_inp_order_idc | ue(v) |
|       nnrpf_out_order_idc | ue(v) |
|       nnrpf_constant_patch_size_flag | u(1) |
|       if( nnrpf_constant_patch_size_flag ) { | |
|         nnrpf_patch_width_minus1 | ue(v) |
|         nnrpf_patch_height_minus1 | ue(v) |
|       } | |
|       do | |
|         nnrpf_uri[ i ] | b(8) |
|       while( nnrpf_uri[ i++ ] != 0 ) | |
|     } | |
|     if( nnrpf_mode_idc == 2 \|\| nnrpf_mode_idc == 3 ) { | |
|       for( i = 0; more_data_in_payload( ); i++ ) | |
|         nnrpf_payload_byte[ i ] | b(8) |
|     } | |
|   } | |
| } | |

FIG. 16

| nnr_post_filter( payloadSize ) { | Descriptor |
| --- | --- |
|    nnrpf_id | u(21) |
|    nnrpf_mode_idc | u(2) |
|    if( nnrpf_mode_idc > 0 ) { | |
|      nnrpf_persistence_flag | u(1) |
|      if( nnrpf_mode_idc == 1 \|\| nnrpf_mode_idc == 2 ) { | |
|         nnrpf_purpose | ue(v) |
|         if( nnrpf_purpose == 1 ) { | |
|            nnrpf_out_sub_width_c_flag | u(1) |
|            nnrpf_out_sub_height_c_flag | u(1) |
|         } | |
|         nnrpf_pic_width_in_luma_samples | ue(v) |
|         nnrpf_pic_height_in_luma_samples | ue(v) |
|         nnrpf_component_last_flag | u(1) |
|         nnrpf_inp_sample_idc | ue(v) |
|         nnrpf_inp_order_idc | ue(v) |
|         nnrpf_out_sample_idc | ue(v) |
|         nnrpf_out_order_idc | ue(v) |
|         nnrpf_constant_patch_size_flag | u(1) |
|         if( nnrpf_constant_patch_size_flag ) { | |
|            nnrpf_patch_width_minus1 | ue(v) |
|            nnrpf_patch_height_minus1 | ue(v) |
|         } | |
|         do | |
|            nnrpf_uri[ i ] | b(8) |
|         while( nnrpf_uri[ i++ ] != 0 ) | |
|      } | |
|      if( nnrpf_mode_idc == 2 \|\| nnrpf_mode_idc == 3 ) { | |
|         for( i = 0; more_data_in_payload( ); i++ ) | |
|            nnrpf_payload_byte[ i ] | b(8) |
|      } | |
|    } | |
| } | |

FIG. 17

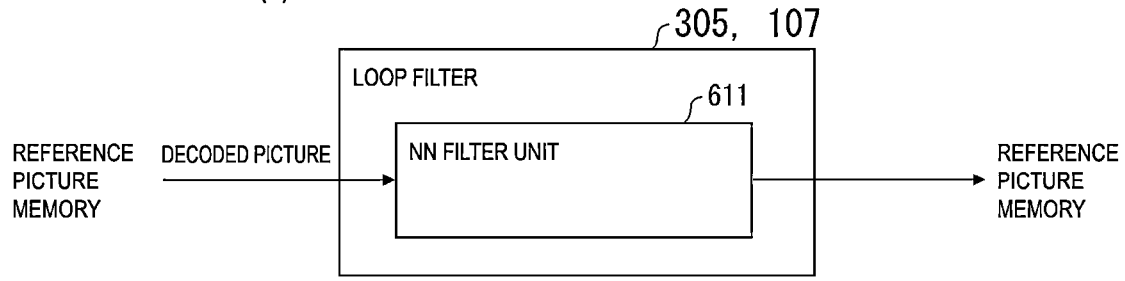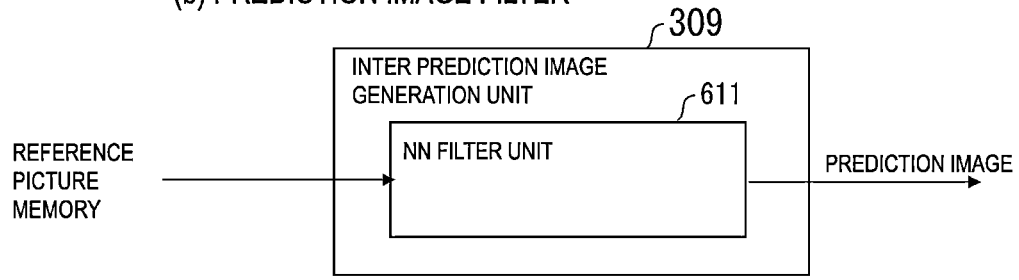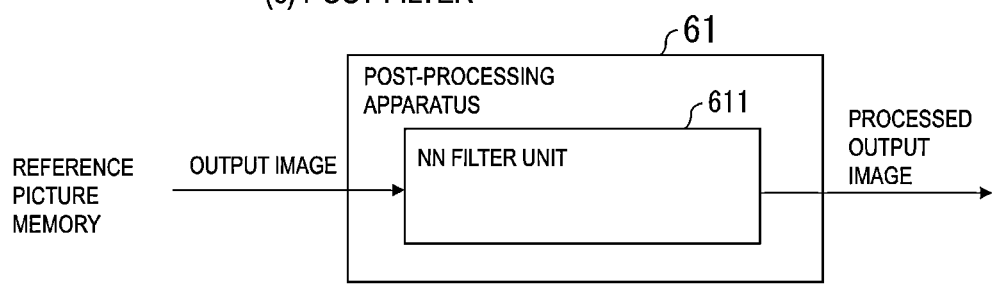
FIG. 19

VIDEO CODING APPARATUS AND VIDEO DECODING APPARATUS

The present application claims the benefit of priority to JP Patent Application No. 2022-065065, filed on Apr. 11, 2022, entitled "VIDEO CODING APPARATUS AND VIDEO DECODING APPARATUS". The contents of JP Patent Application No. 2022-065065 are fully incorporated herein by reference for all purposes.

TECHNICAL FIELD

Embodiments of the present invention relate to a video coding apparatus and a video decoding apparatus.

BACKGROUND ART

A video coding apparatus which generates coded data by coding a video and a video decoding apparatus which generates a decoded picture by decoding the coded data are used for efficiently transmitting or storing videos.

Specific video coding schemes include schemes such as H.264/AVC and 265/High-Efficiency Video Coding (HEVC).

In such a video coding scheme, images (pictures) constituting a video are managed in a hierarchical structure and coded/decoded for each coding unit CU, the hierarchical structure including slices obtained by splitting an image, coding tree units (CTUs) obtained by splitting a slice, coding units (CUs) obtained by splitting a coding tree unit, and transform units (TUs) obtained by splitting a coding unit.

In such a video coding scheme, usually, a prediction image is generated based on a locally decoded picture obtained by coding/decoding an input image (a source image), and prediction errors (also referred to as "difference images" or "residual images") obtained by subtracting the prediction image from the input image are coded. A method of generating a prediction image includes inter-picture prediction (inter prediction) and intra-picture prediction (intra prediction).

NPL 1 is given as an example of a recent technique for video coding and decoding.

H.274 defines a supplemental enhancement information (SEI) message for transmitting image properties, a display method, timings, and the like simultaneously with coded data.

NPL 1, NPL 2, and NPL 3 disclose a method of explicitly defining SEI for transmitting the topology and parameters of a neural network filter that is used as a post-filter and a method of indirectly defining SEI as reference information.

CITATION LIST

Non Patent Literature

NPL 1: B. Choi, Z. Li, W. Wang, W. Jiang, X. Xu, S. Wenger, and S. Liu, "AHG9/AHG11: SEI messages for carriage of neural network information for post-filtering", JVET-V0091

NPL 2: M. M. Hannuksela, E. B. Aksu, F. Cricri, H. R. Tavakoli, and M. Santamaria, "AHG9: On post-filter SEI", JVET-X0112

NPL 3: M. M. Hannuksela, M. Santamaria, F. Cricri, E. B. Aksu, and H. R. Tavakoli, "AHG9: On post-filter SEI", JVET-Y0115

SUMMARY OF INVENTION

Technical Problem

However, there is a problem in NPL 1, NPL 2, and NPL 3 in that a relation between a patch size being a processing unit of a neural network and sizes of input and output pictures is not clearly defined.

There is another problem in NPL 1, NPL 2, and NPL 3 in that a relationship between the data type of values of an input tensor and an output tensor of a neural network and a bit-depth of a pixel value of a decoded picture is not clearly defined.

Solution to Problem

A video decoding apparatus for generating a decoded picture by decoding coded data according to an aspect of the present invention includes resolution inverse conversion circuit that performs a post-filtering by using a neural network specified by resolution conversion information; and neural network filter circuit that derives:

(i) first information relating to a size of a picture,
(ii) second information specifying a size of a picture resulting from applying the post-filtering,
(iii) third information indicating a patch size for the post-filtering, and
(iv) fourth information for output patch derived by using the third information,
in which a product of a value of the first information and a value of the fourth information is equal to a product of a value of the second information and a value of the third information.

A video encoding apparatus for generating an encoded picture by encoding image data according to an aspect of the present invention includes resolution inverse conversion circuit that performs a post-filtering by using a neural network specified by resolution conversion information; and neural network filter circuit that derives:

(i) first information relating to a size of a picture,
(ii) second information specifying a size of a picture resulting from applying the post-filtering,
(iii) third information indicating a patch size for the post-filtering, and
(iv) fourth information for output patch derived by using the third information,
in which a product of a value of the first information and a value of the fourth information is equal to a product of a value of the second information and a value of the third information.

A video decoding apparatus for generating a decoded picture by decoding coded data according to an aspect of the present invention includes performing a post-filtering by using a neural network specified by resolution conversion information; and deriving (i) first information relating to a size of a picture, (ii) second information specifying a size of a picture resulting from applying the post-filtering, (iii) third information indicating a patch size for the post-filtering, and (iv) fourth information for output patch derived by using the third information, in which a product of a value of the first information and a value of the fourth information is equal to a product of a value of the second information and a value of the third information.

Advantageous Effects of Invention

Such a configuration makes it possible to efficiently and accurately perform processing of a neural network.

BRIEF DESCRIPTION OF DRAWINGS

FIG. 4 is a conceptual diagram illustrating an example of reference pictures and reference picture lists.

FIG. 9 is a diagram illustrating an SEI syntax for post-filtering in the present embodiment.

FIG. 10 is a diagram illustrating input/output processing of image data to/from a neural network in the present embodiment.

FIG. 11 is a diagram illustrating the content of processing of inputting image data to an input tensor.

FIG. 12 is a diagram illustrating the content of processing of outputting data from an output tensor. This is a diagram illustrating the content of processing of inputting image data to a tensor.

FIG. 13 is a diagram illustrating another example 1 of syntax of SEI for post-filtering in the present embodiment.

FIG. 14 is a diagram illustrating another example 2 of syntax of SEI for post-filtering in the present embodiment.

FIG. 15 is a diagram illustrating another example 3 of syntax of SEI for post-filtering in the present embodiment.

FIG. 16 is a diagram illustrating another example 4 of syntax of SEI for post-filtering in the present embodiment.

FIG. 17 is a diagram illustrating another example 5 of syntax of SEI for post-filtering in the present embodiment.

FIG. 19 is a diagram illustrating a configuration of a neural network of the NN filter unit 611.

DESCRIPTION OF EMBODIMENTS

First Embodiment

Hereinafter, an embodiment of the present invention will be described with reference to the drawings.

Figure 1:
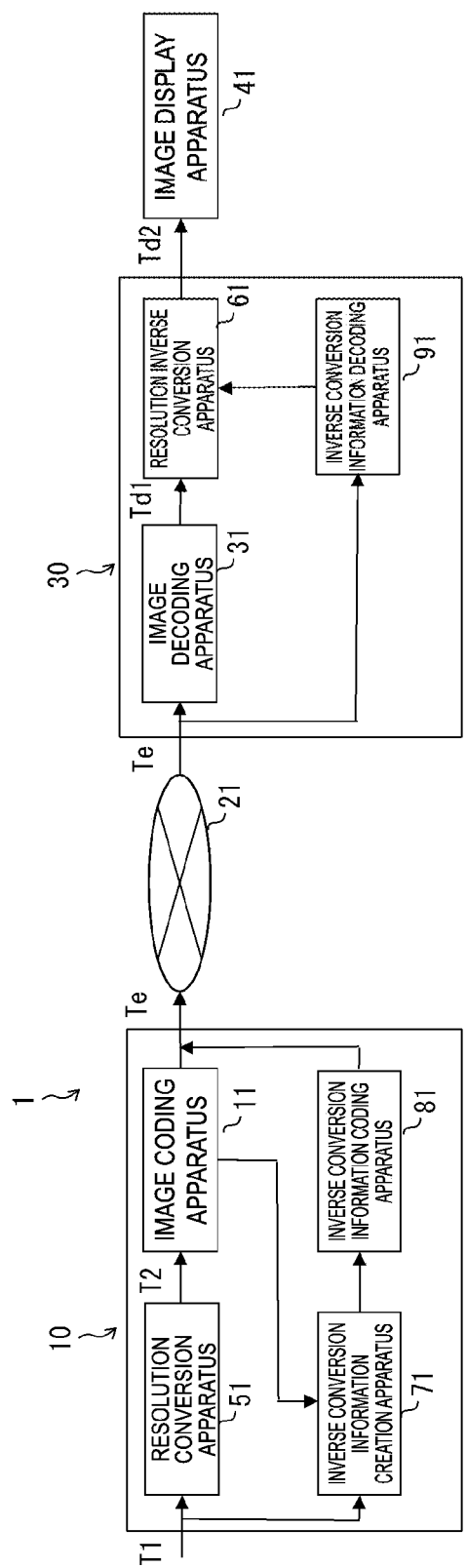
FIG. 1 is a schematic diagram illustrating a configuration of a video transmission system according to the present embodiment.

FIG. 1 is a schematic diagram illustrating a configuration of a video transmission system according to the present embodiment.

A video transmission system 1 is a system in which coded data is transmitted, the coded data being obtained by coding an image whose resolution has been converted into a different resolution; the transmitted coded data is decoded; and the image is inversely converted into the original resolution thereof and then displayed. The video transmission system 1 includes a video coding apparatus 10, a network 21, a video decoding apparatus 30, and an image display apparatus 41.

The video coding apparatus 10 includes a resolution conversion processing apparatus (resolution conversion processing unit) 51, an image coding apparatus (image coder) 11, an inverse conversion information creation apparatus (inverse conversion information creation unit) 71, and an inverse conversion information coding apparatus (inverse conversion information coder) 81.

The video decoding apparatus 30 includes an image decoding apparatus (image decoder) 31, a resolution inverse conversion apparatus (resolution inverse conversion unit) 61, and an inverse conversion information decoding apparatus (inverse conversion information decoder) 91.

The resolution conversion processing apparatus 51 converts the resolution of an image T included in a video, and supplies a variable resolution video T2 including the image with a different resolution to the image coding apparatus 11. The resolution conversion processing apparatus 51 supplies, to the image coding apparatus 11, inverse conversion information indicating whether resolution conversion has been applied to the image. In a case that the information indicates the resolution conversion has been applied, the video coding apparatus 10 sets resolution conversion information ref_pic_resampling_enabled_flag to be described below equal to 1, includes the information in a sequence parameter set SPS of coded data Te and codes the information.

The inverse conversion information creation apparatus 71 creates inverse conversion information based on an image T1 included in the video. The inverse conversion information is derived or selected from the relationship between the input image T1 to be resolution-converted and a resolution-converted, coded, and decoded picture Td1. Additional information is information indicating what is to be selected.

The inverse conversion information is input to the inverse conversion information coding apparatus 81. The inverse conversion information coding apparatus 81 codes the inverse conversion information to generate coded inverse conversion information, and transmits the information to the network 21.

The variable resolution image T2 is input to the image coding apparatus 11. The image coding apparatus 11 codes image size information of the input image in units of picture parameter sets (PPS) using the framework of reference picture resampling (RPR), and transmits the coded image size information to the image decoding apparatus 31.

Although the inverse conversion information coding apparatus 81 is not connected to the image coding apparatus 11 in FIG. 1, the inverse conversion information coding apparatus 81 and the image coding apparatus 11 may communicate necessary information as appropriate.

The network 21 transmits the coded inverse conversion information and the coded data Te to the image decoding apparatus 31. Part or all of the coded inverse conversion information may be included in the coded data Te as supplemental enhancement information SEI. The network 21 is the Internet, a wide area network (WAN), a local area network (LAN), or a combination thereof. The network 21 is not necessarily limited to a bidirectional communication network, and may be a unidirectional communication network that transmits broadcast waves of digital terrestrial television broadcasting, satellite broadcasting, or the like. The network 21 may also be substituted by a storage medium in which the coded data Te is recorded, such as a digital versatile disc (DVD: trade name) or a Blu-ray Disc (BD: trade name).

The image decoding apparatus 31 decodes each piece of the coded data Te transmitted on the network 21, and generates and supplies the variable resolution decoded picture Td1 to the resolution inverse conversion apparatus 61.

The inverse conversion information decoding apparatus 91 decodes the coded inverse conversion information transmitted on the network 21 to generate the decoded inverse conversion information and supplies the information to the resolution inverse conversion apparatus 61.

Although the inverse conversion information decoding apparatus 91 is illustrated separately from the image decoding apparatus 31 in FIG. 1, the inverse conversion information decoding apparatus 91 may be included in the image decoding apparatus 31. For example, the inverse conversion information decoding apparatus 91 may be included in the image decoding apparatus 31 separately from each function unit of the image decoding apparatus 31. Although the inverse conversion information decoding apparatus 91 is not connected to the image decoding apparatus 31 in FIG. 1, the inverse conversion information decoding apparatus 91 and the image decoding apparatus 31 may communicate necessary information as appropriate.

In a case that the resolution conversion information indicates the resolution conversion has been applied, the resolution inverse conversion apparatus 61 generates a decoded picture with the original size thereof by inversely converting the resolution converted image through post-filtering such as super-resolution processing using a neural network, based on the image size information included in the coded data.

In a case that the resolution conversion information indicates a resolution having the same scale, the resolution inverse conversion apparatus 61 may perform post-filtering using the neural network, perform resolution inverse conversion processing for reconstructing the input image T1, and generate a decoded picture Td2.

The image display apparatus 41 displays one decoded picture Td2 or all or some of multiple decoded pictures Td2 input from the resolution inverse conversion apparatus 61. For example, the image display apparatus 41 includes a display device, such as a liquid crystal display, or an organic electro-luminescence (EL) display. The display can be stationary, mobile, HMD, and the like. In a case that the image decoding apparatus 31 has high processing capability, a high-quality image is displayed, and in a case that the image decoding apparatus has low processing capability, an image which does not require high processing and display capability is displayed.

Figure 3:
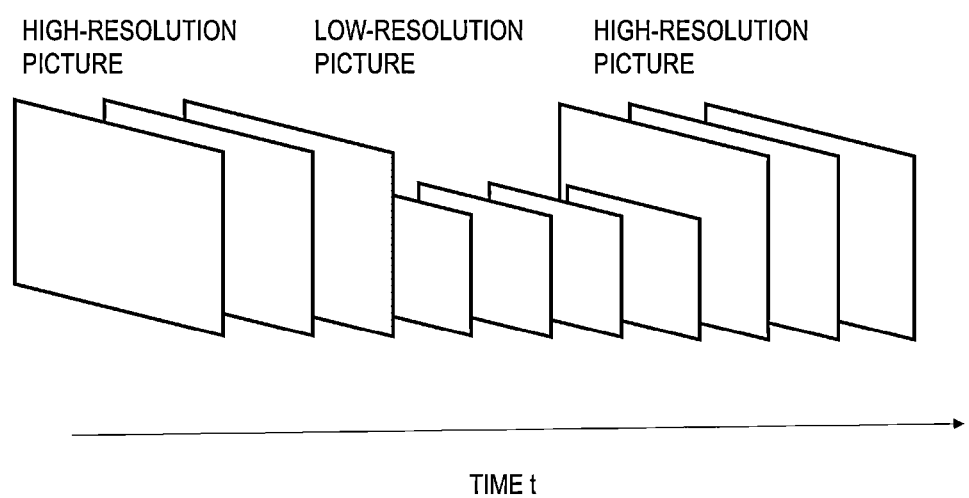
FIG. 3 is a conceptual diagram of an image to be processed in the video transmission system according to the present embodiment.

FIG. 3 is a conceptual diagram of an image to be processed in the video transmission system illustrated in FIG. 1 and is a diagram illustrating a change in resolution of the image over time. However, whether the image has been coded is not specified in FIG. 3. FIG. 3 illustrates an example in which, during processing of the video transmission system, the resolution of an image is reduced and the image is then transmitted to the image decoding apparatus 31. As illustrated in FIG. 3, the resolution conversion processing apparatus 51 typically converts the resolution of the image to be the same as or lower than the resolution of the input image in order to reduce the amount of information to be transmitted.

Operators

Operators used in the present description will be described below.

$>>$ indicates a right bit shift, $<<$ indicates a left bit shift, & indicates a bitwise AND, | indicates a bitwise OR, |=indicates an OR assignment operator, and || indicates a logical sum.

x?y:z is a ternary operator that takes y in a case that x is true (a value other than 0) and takes z in a case that x is false (0).

Clip3(a, b, c) is a function to clip c to a value equal to or greater than a and equal to or smaller than b, and is a function that returns a in a case that c<a, returns b in a case that c>b, and returns c in any other case (provided that a<=b).

abs(a) is a function that returns the absolute value of a.

Int(a) is a function that returns the integer value of a.

floor(a) is a function that returns the maximum integer equal to or smaller than a.

ceil(a) is a function that returns the minimum integer equal to or greater than a.

a/d represents division of a by d (round down after the decimal point).

a^b represents power(a, b). In a case that a=2, a^b is equal to 1<<b.

Structure of Coded Data Te

Prior to the detailed description of the image coding apparatus 11 and the image decoding apparatus 31 according to the present embodiment, a data structure will be described of the coded data Te generated by the image coding apparatus 11 and decoded by the image decoding apparatus 31.

Figure 2:
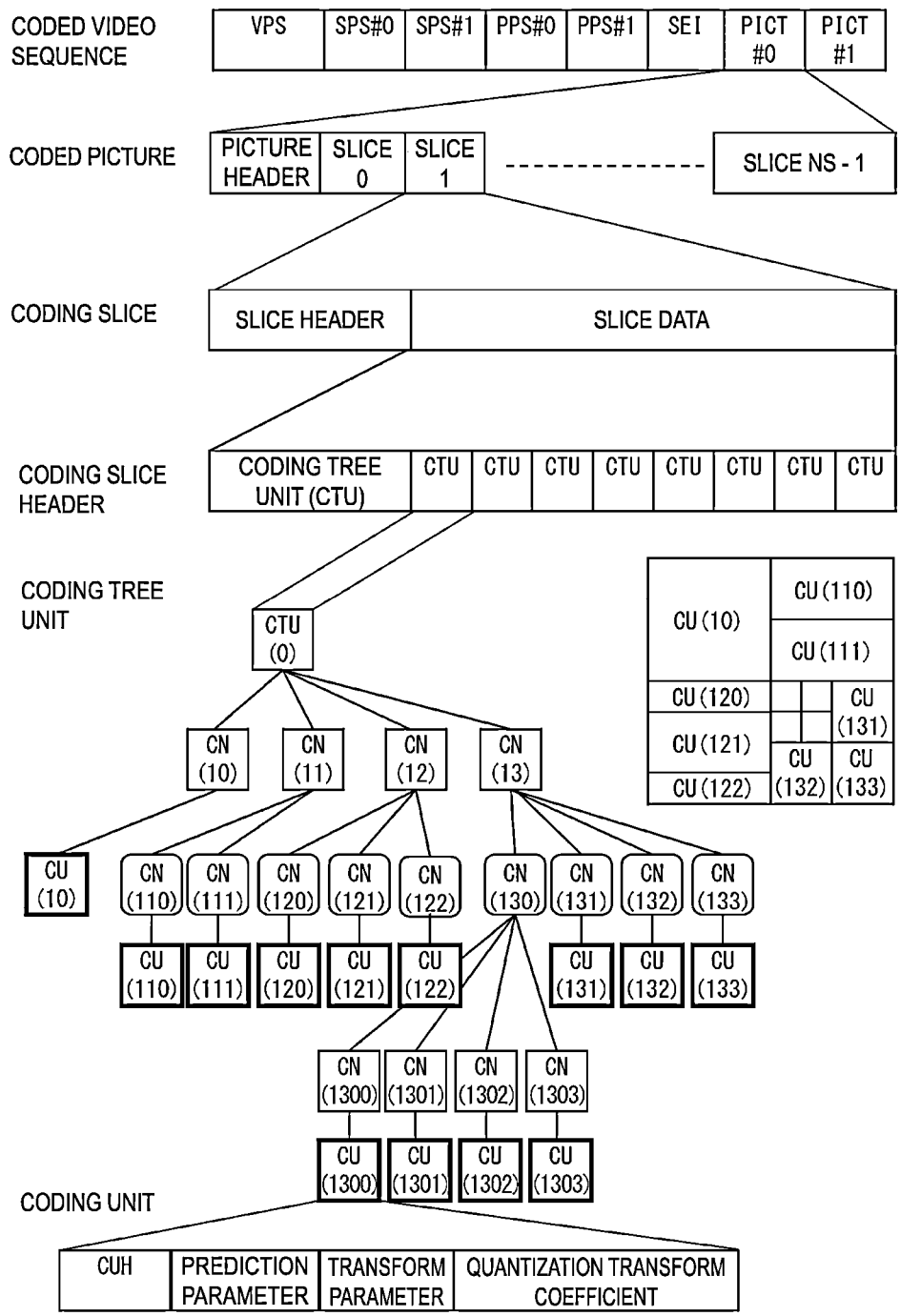
FIG. 2 is a diagram illustrating a hierarchical structure of coded data.

FIG. 2 is a diagram illustrating the hierarchical structure of data in the coded data Te. The coded data Te includes, as an example, a sequence and multiple pictures constituting the sequence. FIG. 2 is a diagram illustrating a coded video sequence defining a sequence SEQ, a coded picture defining a picture PICT, a coding slice defining a slice S, coding slice data defining slice data, a coding tree unit included in the coding slice data, and a coding unit included in the coding tree unit.

Coded Video Sequence

In the coded video sequence, a set of data is defined and referred to by the image decoding apparatus 31 to decode the sequence SEQ to be processed. As illustrated in FIG. 2, the sequence SEQ includes a video parameter set VPS, sequence parameter sets SPS, picture parameter sets PPS, an adaptation parameter set APS, pictures PICT, and supplemental enhancement information SEI.

In the video parameter set VPS, for a video composed of multiple layers, a set of coding parameters common to multiple videos, and a set of coding parameters associated with the multiple layers and individual layers included in the video are defined.

In the sequence parameter set SPS, a set of coding parameters is defined and referred to by the image decoding apparatus 31 to decode a target sequence. For example, the width and height of pictures are defined. Note that multiple SPSs may be present. In that case, any of the multiple SPSs is selected from the PPS.

Here, the sequence parameter set SPS includes the following syntax elements.

ref_pic_resampling_enabled_flag: A flag specifying whether to use a function of making the resolution variable (resampling) in a case of decoding each image included in a single sequence referring to a target SPS. In another respect, the flag indicates that the size of a reference picture referred to in generation of a prediction image changes between each of the images indicated by the single sequence. In a case that the value of the flag is 1, the above resampling is applied, and in a case that the value is 0, resampling is not applied.

pic_width_max_in_luma_samples: A syntax element indicating, in units of luminance blocks, the width of an image having the largest width among the images included in a single sequence. The value of the syntax element is required to be a value other than 0 and an integer multiple of Max(8, MinCbSizeY). Here, MinCbSizeY is a value determined based on the minimum size of the luminance blocks.

pic_height_max_in_luma_samples: A syntax element indicating, in units of luminance blocks, the height of the image having the largest height among the images included in a single sequence. The value of the syntax element is required to be a value other than 0 and an integer multiple of Max(8, MinCbSizeY).

sps_temporal_mvp_enabled_flag: A flag specifying whether to use temporal motion vector prediction in the case of decoding a target sequence. In a case that the value of the flag is 1, temporal motion vector prediction is used, and in a case that the value is 0, temporal motion vector prediction is not used. Defining this flag makes it possible to prevent coordinate positions to be referred to from being misaligned in a case that reference pictures with different resolutions are referred to or in other cases.

In the picture parameter set PPS, a set of coding parameters is defined and referred to by the image decoding apparatus 31 to decode each picture in a target sequence. For example, a reference value (pic_init_qp_minus26) for a quantization step size used for decoding a picture and a flag (weighted_pred_flag) indicating application of weight prediction are included. Note that multiple PPSs may be present. In that case, any of the multiple PPSs is selected from each picture in the target sequence.

Here, the picture parameter set PPS includes the following syntax elements.

pps_pic_width_in_luma_samples: A syntax element indicating the width of a target picture. The value of the syntax element is required to be a value other than 0, an integer multiple of Max(8, MinCbSizeY), and a value equal to or smaller than sps_pic_width_max_in_luma_samples.

pps_pic_height_in_luma_samples: A syntax element indicating the height of a target picture. The value of the syntax element is required to be a value other than 0, an integer multiple of Max(8, MinCbSizeY), and a value equal to or smaller than sps_pic_height_max_in_luma_samples.

conformance_window_flag: A flag indicating whether a conformance (cropping) window offset parameter is subsequently signaled and a flag indicating a location where the conformance window is displayed. In a case that the flag is 1, the parameter is signaled, and in a case that the flag is zero, it indicates that no conformance window offset parameter is present.

conf_win_left_offset, conf_win_right_offset, conf_win_top_offset, conf_win_bottom_offset: Offset values respectively indicating, for a rectangular region indicated in picture coordinates for output, the left, right, top, and bottom positions of a picture output in decoding processing. In a case that the value of conformance_window_flag is zero, the values of conf_win_left_offset, conf_win_right_offset, conf_win_top_offset, and conf_win_bottom_offset are inferred to be 0.

A width PicWidthInLumaSamples and a height PicHeightInLumaSamples of a picture for output are derived as follows.

$$PicWidthInLumaSamples = pps\_pic\_width\_in\_luma\_samples - SubWidthC*(conf\_win\_right\_offset + conf\_win\_left\_offset)$$

$$PicHeightInLumaSamples = pps\_pic\_height\_in\_luma\_samples - SubHeightC*(conf\_win\_bottom\_offset + conf\_win\_top\_offset)$$

Here, a variable ChromaFormatIdc of a chroma format is a value of sps_chroma_format_id, variable SubWidthC and variable SubHeightC are values determined by ChromaFormatIdc, both SubWidthC and SubHeightC are 1 in the case of the monochrome format, both SubWidthC and SubHeightC are 2 in the case of the 4:2:0 format, SubWidthC is 2 and SubHeightC is 1 in the case of the 4:2:2 format, and both SubWidthC and SubHeightC are 1 in the case of the 4:4:4 format.

scaling_window_flag: A flag indicating whether a scaling window offset parameter is present in a target PPS and a flag being related to defining an image size to be output. The flag being 1 indicates that the parameter is present in the PPS, and the flag being 0 indicates that the parameter is not present in the PPS. In a case that the value of ref_pic_resampling_enabled_flag is 0, the value of scaling_window_flag is required to be 0.

scaling_win_left_offset, scaling_win_right_offset, scaling_win_top_offset, scaling_win_bottom_offset: Syntax elements indicating an offset applied to the image size for scaling ratio calculation for the left, right, top, and bottom positions of a target picture in units of luma pixels. In a case that the value of scaling_window_flag is 0, the values of scaling_win_left_offset, scaling_win_right_offset, scaling_win_top_offset, scaling_win_bottom_offset are inferred to be 0. The value of scaling_win_left_offset+scaling_win_right_offset is required to be smaller than pic_width_in_luma_samples, and the value of scaling_win_top_offset+scaling_win_bottom_offset is required to be smaller than pic_height_in_luma_samples.

A width PicScaleWidthL and a height PicScaleHeightL of a picture for scaling are derived as described below.

$$PicScaleWidthL = pic\_width\_in\_luma\_samples - SubWidthC*(scaling\_win\_right\_offset + scaling\_win\_left\_offset)$$

$$PicScaleHeightL = pic\_height\_in\_luma\_samples - SubHeightC*(scaling\_win\_bottom\_offset + scaling\_win\_top\_offset)$$

Sub-Pictures

A picture may be further divided into rectangular sub-pictures. The size of a sub-picture may be a multiple of a CTU. A sub-picture is defined by a set of an integer number of tiles that are horizontally and vertically consecutive. That is, a picture is divided into rectangular tiles, and a sub-picture is defined as a set of rectangular tiles. A sub-picture may be defined by using the ID of the top left tile and the ID of the bottom right tile of the sub-picture. The slice header may include sh_subpic_id indicating the ID of a sub-picture.

Coded Picture

In a coded picture, a set of data is defined and referred to by the image decoding apparatus 31 to decode a picture PICT to be processed. As illustrated in FIG. 2, the picture PICT includes a picture header PH and slices 0 to NS−1 (NS is the total number of slices included in the picture PICT).

Hereinafter, in a case that the slices 0 to NS−1 need not be distinguished from one another, subscripts of reference signs may be omitted. The same applies to other data with subscripts included in the coded data Te which will be described below.

The picture header includes the following syntax elements.

pic_temporal_mvp_enabled_flag: A flag specifying whether temporal motion vector prediction is used for inter prediction of a slice associated with the picture header. In a case that the value of the flag is 0, the syntax element of a slice associated with the picture header is restricted such that the temporal motion vector prediction is not used to decode the slice. The value of the flag being 1 indicates that the temporal motion vector prediction is used to decode the slice associated with the picture header. In a case that the flag is not specified, the value is inferred to be 0.

Coding Slice

In a coding slice, a set of data is defined and referred to by the image decoding apparatus 31 to decode a slice S to be processed. As illustrated in FIG. 2, the slice includes a slice header and slice data.

The slice header includes a coding parameter group referred to by the image decoding apparatus 31 in order to determine a decoding method for a target slice. Slice type indication information (slice_type) indicating a slice type is one example of a coding parameter included in the slice header.

Examples of slice types that can be indicated by the slice type indication information include (1) I slices for which only intra prediction is used in coding, (2) P slices for which uni-prediction (L0 prediction) or intra prediction is used in coding, and (3) B slices for which uni-prediction (L0 prediction or L1 prediction), bi-prediction, or intra prediction is used for coding. Note that the inter prediction is not limited to uni-prediction and bi-prediction, and a prediction image may be generated by using a larger number of reference pictures. Hereinafter, slices referred to as P or B slices indicate slices including a block for which inter prediction can be used.

Note that the slice header may include a reference (pic_parameter_set_id) to the picture parameter set PPS.

Coding Slice Data

In the coding slice data, a set of data is defined and referred to by the image decoding apparatus 31 to decode the slice data to be processed. The slice data includes CTUs as indicated in the coding slice header of FIG. 2. A CTU is a block with a fixed size (for example, 64×64) constituting a slice, and may also be referred to as a largest coding unit (LCU).

Coding Tree Unit

In FIG. 2, a set of data is defined and referred to by the image decoding apparatus 31 to decode a CTU to be processed. The CTU is split into coding units CUs, each of which is a basic unit of coding processing, through a recursive quad tree split (QT split), a binary tree split (BT split), or a ternary tree split (TT split). The BT split and the TT split are collectively referred to as a multi tree split (MT split). Nodes of a tree structure obtained through the recursive quad tree split are referred to as coding nodes. Intermediate nodes of a quad tree, a binary tree, and a ternary tree are coding nodes, and a CTU itself is also defined as the highest coding node.

A CT includes, as CT information, a CU split flag (split_cu_flag) indicating whether to perform a CT split, a QT split flag (qt_split_cu_flag) indicating whether to perform a QT split, an MT split direction (mtt_split_cu_vertical_flag) indicating a split direction of an MT split, and an MT split type (mtt_split_cu_binary_flag) indicating the split type of the MT split. split_cu_flag, qt_split_cu_flag, mtt_split_cu_vertical_flag, and mtt_split_cu_binary_flag are transmitted for each coding node.

Different trees may be used for luma and chroma. The type of a tree is represented by treeType. For example, in a case that a common tree is used for luma (Y, cIdx=0) and chroma (Cb/Cr, cIdx=1,2), a single common tree is represented by treeType=SINGLE_TREE. In a case that two different trees (DUAL tree) are used for luma and chroma, the luma tree is represented by treeType=DUAL_TREE_LUMA, and the chroma tree is represented by treeType=DUAL_TREE_CHROMA.

Coding Unit

In FIG. 2, a set of data is defined and referred to by the image decoding apparatus 31 to decode a coding unit to be processed. Specifically, a CU includes a CU header CUH, a prediction parameter, a transform parameter, a quantization transform coefficient, and the like. In the CU header, a prediction mode and the like are defined.

There are cases that the prediction processing is performed in units of CUs or performed in units of sub-CUs obtained by further splitting a CU. In a case that the size of a CU is equal to the size of a sub-CU, the number of sub-CUs in the CU is one. In a case that a CU is larger in size than a sub-CU, the CU can be split into sub-CUs. For example, in a case that a CU has a size of 8×8, and a sub-CU has a size of 4×4, the CU can be split into four sub-CUs including two horizontal halves and two vertical halves.

There are two types of prediction (prediction modes), which are intra prediction and inter prediction. Intra prediction refers to prediction in an identical picture, and inter prediction refers to prediction processing performed between different pictures (for example, between different display times or different layer images).

Although transform and quantization processing is performed in units of CUs, the quantization transform coefficient may be subjected to entropy coding in units of sub-blocks such as 4×4 sub-blocks.

Prediction Parameters

A prediction image is derived through prediction parameters associated with a block. The prediction parameters include prediction parameters for intra prediction and inter prediction.

The prediction parameters for inter prediction will be described below. Inter prediction parameters include prediction list utilization flags predFlagL0 and predFlagL1, reference picture indexes refIdxL0 and refIdxL1, and motion vectors mvL0 and mvL1. predFlagL0 and predFlagL1 are flags indicating whether reference picture lists (L0 list and L1 list) are used, and in a case that the value of each of the flags is 1, a corresponding reference picture list is used. Note that in a case that the present specification mentions "a flag indicating whether XX", a flag having a value other than 0 (for example, 1) assumes a case of XX, and a flag having a value of 0 assumes a case of being not XX, 1 being treated as true and 0 being treated as false in a logical negation, a logical product, and the like (the same is applied hereinafter). However, other values can be used for true values and false values in actual apparatuses and methods.

For example, syntax elements for deriving the inter prediction parameters include an affine flag affine_flag, a merge flag merge_flag, a merge index merge_idx, and an MMVD flag mmvd_flag that are used in a merge mode; an inter prediction indicator inter_pred_idc and a reference picture index refIdxLX that are used for selecting a reference picture in an AMVP mode; and a prediction vector index mvp_LX_idx, a difference vector mvdLX, and a motion vector resolution mode amvr_mode that are used for deriving a motion vector.

Reference Picture List

A reference picture list is a list including reference pictures stored in a reference picture memory 306. FIG. 4 is a conceptual diagram illustrating an example of reference pictures and reference picture lists. In the conceptual diagram of FIG. 4 illustrating an example of reference pictures, rectangles indicate pictures; arrows indicate reference relationships of the pictures; the horizontal axis indicates time; I, P, and B in the rectangles respectively indicate an intra-picture, a uni-prediction picture, and a bi-prediction picture; and numbers in the rectangles indicate a decoding order. As illustrated, the decoding order of the pictures is I0, P1, B2, B3, and B4, and the display order is I0, B3, B2, B4, and P1. FIG. 4 illustrates an example of reference picture lists of the picture B3 (target picture). The reference picture list is a list representing candidates for a reference picture, and one picture (slice) may include one or more reference picture lists. In the illustrated example, the target picture B3 includes two reference picture lists that are an L0 list RefPicList0 and an L1 list RefPicList1. For individual CUs, which picture in a reference picture list RefPicListX (X=0 or 1) will be actually referred to is indicated in refIdxLX. The diagram illustrates an example of refIdxL0=2, refIdxL1=0. Note that LX is a description method used in a case of not distinguishing between L0 prediction and L1 prediction, and hereinafter, parameters for the L0 list are distinguished from parameters for the L1 list by replacing LX with L0 and L1.

Merge Prediction and AMVP Prediction

A decoding (coding) method for prediction parameters include a merge prediction (merge) mode and an advanced motion vector prediction (AMVP) mode, and merge_flag is a flag for identifying the modes. The merge prediction mode is a mode in which a prediction list utilization flag predFlagLX, a reference picture index refIdxLX, and a motion vector mvLX are derived from prediction parameters of neighboring blocks already processed, or the like, without being included in coded data. The AMVP mode is a mode in which inter_pred_idc, refIdxLX, and mvLX are included in the coded data. Note that mvLX is coded as mvp_LX_idx identifying a prediction vector mvpLX and a difference vector mvdLX. In addition to the merge prediction mode, an affine prediction mode and an MMVD prediction mode may be available.

inter_pred_idc has a value indicating the type and number of reference pictures, and takes any value of PRED_L0, PRED_L1, or PRED_BI. PRED_L0 and PRED_L1 indicate uni-prediction which uses one reference picture managed in the L0 list and one reference picture managed in the L1 list, respectively. PRED_BI indicates bi-prediction which uses two reference pictures managed in the L0 list and the L1 list.

merge_idx is an index indicating which prediction parameter is to be used as a prediction parameter for a target block, among prediction parameter candidates (merge candidates) derived from processed blocks.

Motion Vector mvLX indicates a shift amount between blocks in two different pictures. A prediction vector and a difference vector related to mvLX are referred to as mvpLX and mvdLX, respectively.

Inter Prediction Indicator inter_pred_idc and Prediction List Utilization Flag predFlagLX The relationship between inter_pred_idc, and predFlagL0 and predFlagL1 is as follows, and either can be converted into the other.

inter_pred_idc=(predFlag$L$1<<1)+predFlag$L$0 predFlag$L$0=inter_pred_idc & 1 predFlag$L$1=inter_pred_idc>>1

Note that the inter prediction parameters may use a prediction list utilization flag or may use an inter prediction indicator. Determination using the prediction list utilization flag may be replaced with a determination using an inter prediction indicator. On the other hand, determination using the inter prediction indicator may be replaced with determination using the prediction list utilization flag.

Configuration of Image Decoding Apparatus

Figure 5:
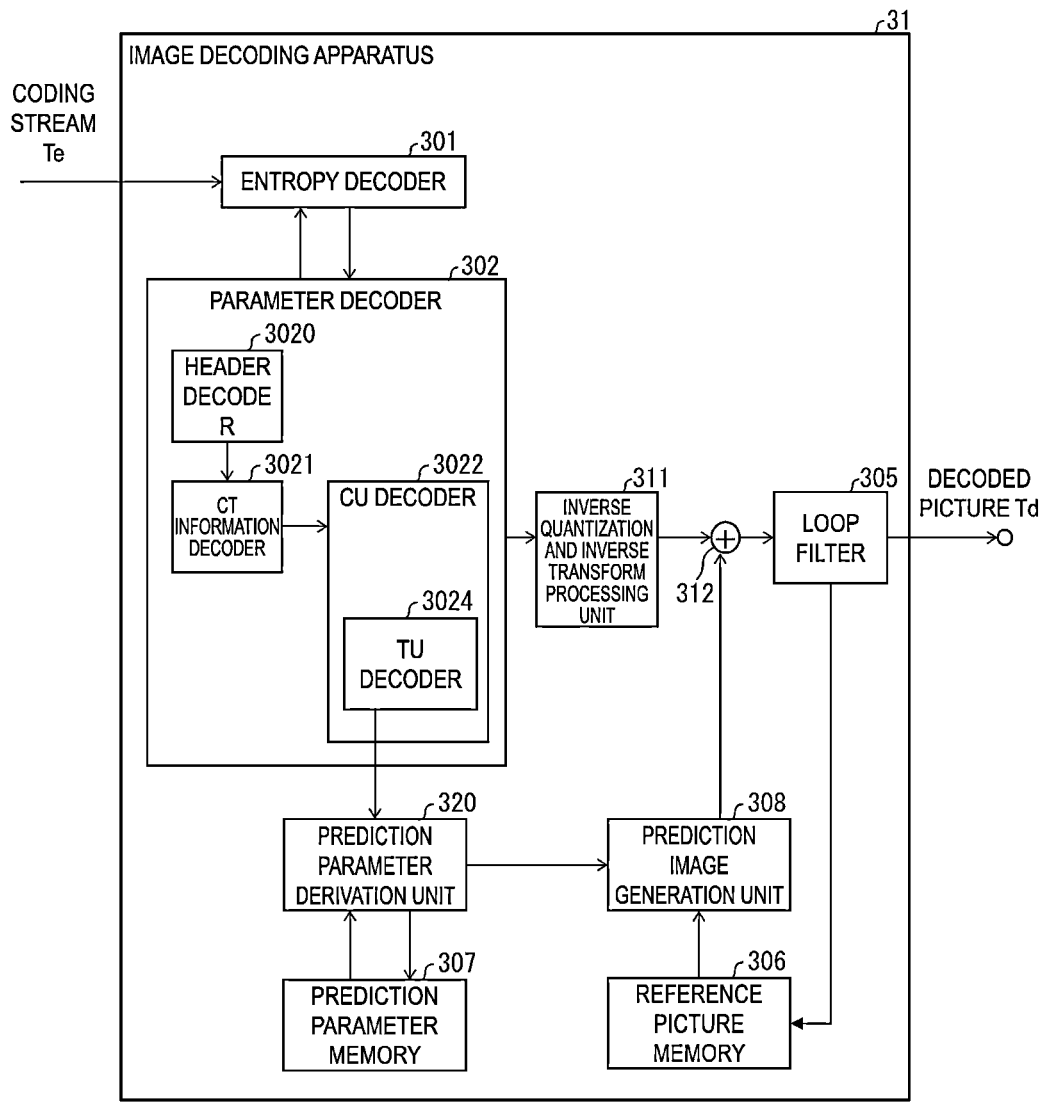
FIG. 5 is a schematic diagram illustrating a configuration of an image decoding apparatus.

A configuration of the image decoding apparatus 31 (FIG. 5) according to the present embodiment will be described.

The image decoding apparatus 31 includes an entropy decoder 301, a parameter decoder (a prediction image decoding apparatus) 302, a loop filter 305, the reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Note that a configuration in which the loop filter 305 is not included in the image decoding apparatus 31 may be used in accordance with the image coding apparatus 11 to be described later.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as a decoding module. The header decoder 3020 decodes, from coded data, a slice header (slice information), and parameter set information such as a VPS, an SPS, a PPS, and an APS. The CT information decoder 3021 decodes a CT from the coded data. The CU decoder 3022 decodes a CU from the coded data. In a case that a TU includes a prediction error, the TU decoder 3024 decodes QP update information (quantization correction value) and a quantization prediction error (residual_coding) from the coded data.

In a mode other than a skip mode (skip_mode==0), the TU decoder 3024 decodes the QP update information and a quantization prediction error from the coded data. More specifically, in a case of skip_mode==0, the TU decoder 3024 decodes a flag cu_cbp indicating whether a quantization prediction error is included in the target block, and decodes the quantization prediction error in a case that cu_cbp is 1. In a case that cu_cbp is not present in the coded data, 0 is derived.

The TU decoder 3024 decodes, from the coded data, an index mts_idx indicating a transform basis. The TU decoder 3024 decodes, from the coded data, an index stIdx indicating the use of secondary transform and the transform basis. stIdx having 0 indicates non-application of the secondary transform, stIdx having 1 indicates transform of one in a set (pair) of secondary transform bases, and stIdx having 2 indicates transform of the other in the pair of secondary transform bases.

The prediction image generation unit 308 includes an inter prediction image generation unit 309 and an intra prediction image generation unit 310.

The prediction parameter derivation unit 320 includes an inter prediction parameter derivation unit 303 and an intra prediction parameter derivation unit 304.

The entropy decoder 301 performs entropy decoding on the coded data Te input from an external source to decode individual pieces of code (syntax elements). Methods of entropy coding include a method in which syntax elements are subjected to variable-length coding by using a context (probability model) that is adaptively selected according to the type of syntax elements and the surrounding conditions, and a method in which syntax elements are subjected to variable-length coding by using a predetermined table or calculation expression. In Context Adaptive Binary Arithmetic Coding (CABAC) of the former method, a CABAC state of a context (the type of a dominant symbol (0 or 1) and a probability state index pStateIdx indicating a probability) is stored in a memory. The entropy decoder 301 initializes all CABAC states at the beginning of a segment (tile, CTU row, or slice). The entropy decoder 301 transforms a syntax element into a binary string (bin string) and decodes each bit of the bin string. In a case that a context is used, a context index ctxInc is derived for each bit of the syntax element, the bit is decoded using the context, and the CABAC state of the context used is updated. Bits that do not use the context are decoded at an equal probability (EP, bypass), and ctxInc derivation and CABAC states are omitted. The decoded syntax element includes prediction information for generating a prediction image, a prediction error for generating a difference image, and the like.

The entropy decoder 301 outputs the decoded code to the parameter decoder 302. The decoded code includes, for example, a prediction mode predMode, merge_flag, merge_idx, inter_pred_idc, refIdxLX, mvp_LX_idx, mvdLX, and amvr_mode. Which code is to be decoded is controlled based on an indication of the parameter decoder 302.

Basic Flow

Figure 6:
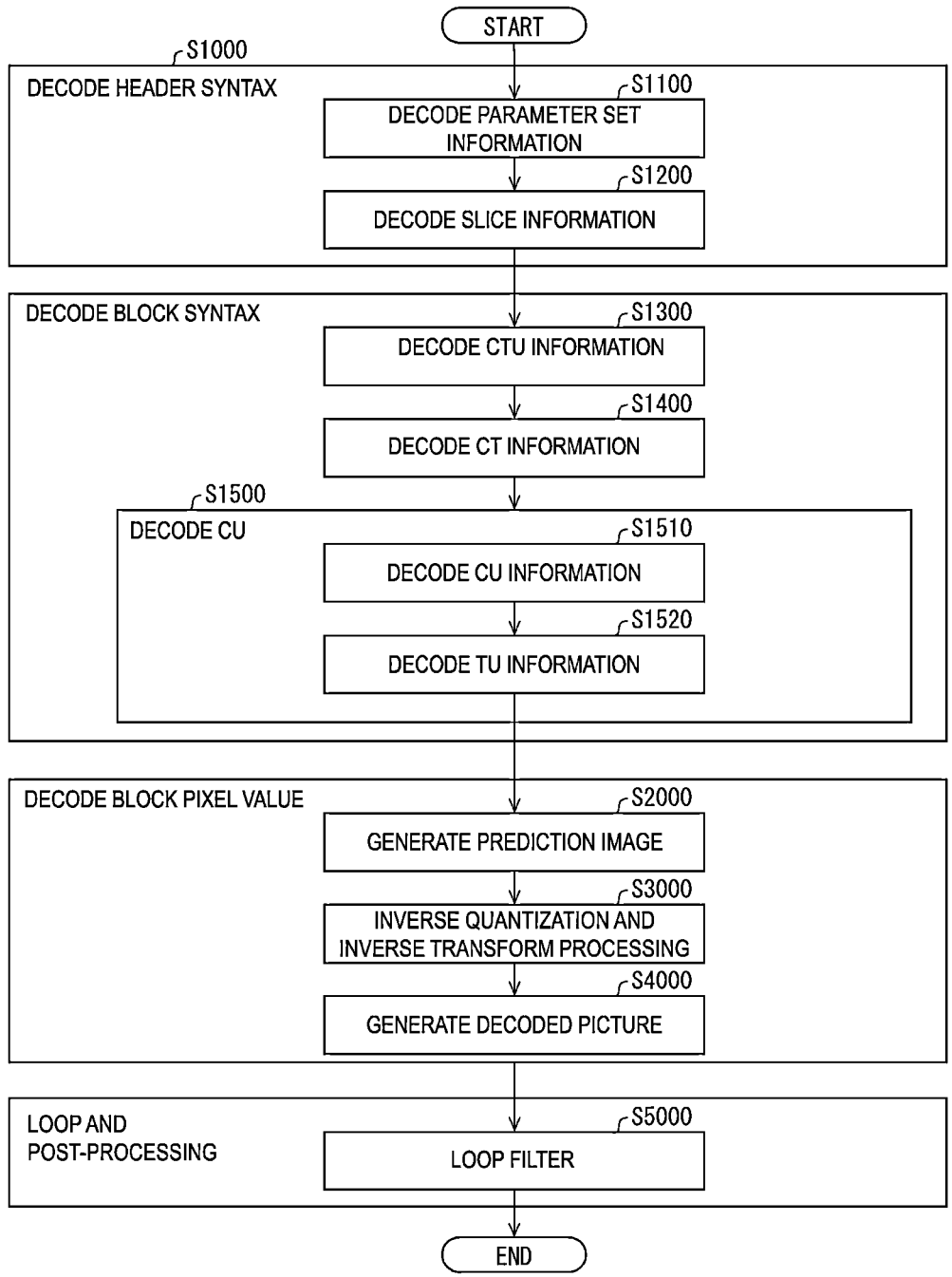
FIG. 6 is a flowchart illustrating a general operation of the image decoding apparatus.

FIG. 6 is a flowchart for describing a general operation of the image decoding apparatus 31.

(S1100: Decoding of parameter set information) The header decoder 3020 decodes parameter set information such as a VPS, an SPS, and a PPS from coded data.

(S1200: Decoding of slice information) The header decoder 3020 decodes the slice header (slice information) from the coded data.

Hereinafter, the image decoding apparatus 31 repeats the processing from S1300 to S5000 for each CTU included in the target picture, and thereby derives a decoded picture of each CTU.

(S1300: Decoding of CTU information) The CT information decoder 3021 decodes the CTUs from the coded data.

(S1400: Decoding of CT information) The CT information decoder 3021 decodes CTs from the coded data.

(S1500: Decoding of CU) The CU decoder 3022 decodes the CUs from the coded data by performing S1510 and S1520.

(S1510: Decoding of CU information) The CU decoder 3022 decodes CU information, prediction information, a TU split flag split_transform_flag, CU residual flags cbf_cb, cbf_cr, and cbf_luma from the coded data.

(S1520: Decoding of TU information) In a case that a prediction error is included in a TU, the TU decoder 3024 decodes QP update information, a quantization prediction error, and a transform index mts_idx from the coded data. Note that the QP update information is a difference value from a quantization parameter prediction value qPpred, which is a prediction value of a quantization parameter QP.

(S2000: Generation of prediction image) The prediction image generation unit 308 generates a prediction image based on the prediction information for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded picture) The addition unit 312 generates a decoded picture of the target CU by adding the prediction image supplied by the prediction image generation unit 308 and the prediction error supplied by the inverse quantization and inverse transform processing unit 311.

(S5000: Loop filter) The loop filter 305 generates a decoded picture by applying a loop filter such as a deblocking filter, an SAO, and an ALF to the decoded picture.

Configuration of Inter Prediction Parameter Derivation Unit

The inter prediction parameter derivation unit 303 (motion vector derivation apparatus) derives an inter prediction parameter with reference to the prediction parameters stored in the prediction parameter memory 307, based on the syntax element input from the parameter decoder 302. The inter prediction parameter derivation unit 303 outputs the inter prediction parameter to the inter prediction image generation unit 309 and the prediction parameter memory 307. Since the inter prediction parameter derivation unit 303 and internal elements thereof being an AMVP prediction parameter derivation unit 3032, a merge prediction parameter derivation unit 3036, an affine prediction unit 30372, an MMVD prediction unit 30373, a GPM unit 30377, a DMVR unit 30537, and an MV addition unit 3038 are components common to the image coding apparatus and the image decoding apparatus, these units may be collectively referred to as a motion vector derivation unit (motion vector derivation apparatus).

A scale parameter derivation unit 30378 included in the header decoder 3020 and the header coder 1110 derives a scaling ratio RefPicScale[i][j][0] in the horizontal direction of the reference picture, a scaling ratio RefPicScale[i][j][1] in the vertical direction of the reference picture, and RefPicIsScaled[i][j] indicating whether the reference picture is scaled. Here, with i indicating whether the reference picture list is an L0 list (i=0) or an L1 list (i=1), and j being the value (reference picture) of the L0 reference picture list or the L1 reference picture list, derivation is performed as follows.

$$RefPicScale[i][j][0]=((fRefWidth<<14)+(PicScaleWidthL>>1))/PicScaleWidthL$$

$$RefPicScale[i][j][1]=((fRefHeight<<14)+(PicScaleHeightL>>1))/PicScaleHeightL$$

$$RefPicIsScaled[i][j]=(RefPicScale[i][j][0]!=(1<<14))\|(RefPicScale[i][j][1]!=(1<<14))$$

Here, the variable PicScaleWidthL is a value obtained in a case that a coded picture is referred to and the scaling ratio in the horizontal direction is calculated, and a value obtained by subtracting a left offset value and a right offset value from the number of pixels in the horizontal direction of the luma of the coded picture is used. The variable PicScaleHeightL is a value obtained in a case that the coded picture is referred to and the scaling ratio in the vertical direction is calculated, and a value obtained by subtracting a top offset value and a bottom offset value from the number of pixels in the vertical direction of the luma of the coded picture is used. The variable fRefWidth takes the value of PicScaleWidthL of the reference list value j in a list i, and the variable fRefHeight takes the value of PicScaleHeightL of the reference picture list value j in the list i.

MV Addition Unit

The MV addition unit 3038 adds mvpLX input from the AMVP prediction parameter derivation unit 3032 and decoded mvdLX to calculate mvLX. The MV addition unit 3038 outputs the calculated mvLX to the inter prediction image generation unit 309 and the prediction parameter memory 307.

$$mvLX[0]=mvpLX[0]+mvdLX[0]$$

$$mvLX[1]=mvpLX[1]+mvdLX[1]$$

The loop filter 305 is a filter provided in the coding loop, and is a filter that improves image quality by removing block distortion and ringing distortion. The loop filter 305 applies a filter such as a deblocking filter, a Sample Adaptive Offset (SAO), and an Adaptive Loop Filter (ALF) to a decoded picture of CUs generated by the addition unit 312.

A DF unit 601 includes a bS derivation unit 602 that derives a strength bS of the deblocking filter in units of pixels, boundaries, and line segments, and a DF filter unit 602 that performs deblocking filtering to reduce block noise.

The DF unit 601 derives an edge degree edgeIdc indicating whether a partition split boundary, a prediction block boundary, and a transform block boundary are present in an input image resPicture that has not been subjected to neural network (NN) processing (processing of the NN filter unit 611) and a maximum filter length maxFilterLength of the deblocking filter. The strength bS of the deblocking filter is derived from the edgeIdc, the boundary of the transform block, and the coding parameter. The coding parameters include, for example, a prediction mode CuPredMode, a BDPCM prediction mode intra_bdpcm_luma_flag, a flag indicating whether the mode is the IBC prediction mode, and flags tu_y_coded_flag and tu_u_coded_flag indicating whether there is a coefficient that is not 0 is present in a motion vector, a reference picture, and a transform block. edgeIdc and bS may take a value of 0, 1, or 2, or may take other values.

The reference picture memory 306 stores the decoded picture of the CUs in a predetermined position for each target picture and target CU.

The prediction parameter memory 307 stores the prediction parameter in a predetermined position for each CTU or CU. Specifically, the prediction parameter memory 307 stores the parameter decoded by the parameter decoder 302, the parameter derived by the prediction parameter derivation unit 320, and the like.

Parameters derived by the prediction parameter derivation unit 320 are input to the prediction image generation unit 308. The prediction image generation unit 308 reads a reference picture from the reference picture memory 306. The prediction image generation unit 308 generates a prediction image of a block or a subblock by using the parameters and the reference picture (reference picture block) in the prediction mode indicated by predMode. Here, the reference picture block refers to a set of pixels (referred to as a block because they are normally rectangular) in a reference picture and is a region that is referred to for generating a prediction image.

In a case that predMode indicates the inter prediction mode, the inter prediction image generation unit 309 generates a prediction image of a block or a subblock through inter prediction by using the inter prediction parameters input from the inter prediction parameter derivation unit 303 and the reference picture.

Motion Compensation

A motion compensation unit 3091 (interpolation image generation unit 3091) generates an interpolation image (motion compensation image) by reading a reference block from the reference picture memory 306 based on the inter prediction parameters (predFlagLX, refIdxLX, and mvLX) input from the inter prediction parameter derivation unit 303. The reference block is a block located in the reference picture RefPicLX indicated by refIdxLX at a position shifted by mvLX from the position of the target block. Here, in a case that mvLX does not have integer accuracy, an interpolation image is generated by using a filter referred to as a motion compensation filter and generates pixels at fractional positions.

The motion compensation unit 3091 first derives an integer position (xInt, yInt) and a phase (xFrac, yFrac) corresponding to in-prediction block coordinates (x, y) through the following equation.

$$xInt=xPb+(mvLX[0]>>(\log 2(MVPREC)))+x$$

$$xFrac=mvLX[0]\&(MVPREC-1)$$

$$yInt=yPb+(mvLX[1]>>(\log 2(MVPREC)))+y$$

$$yFrac=mvLX[1]\&(MVPREC-1)$$

Here, (xPb, yPb) indicates the top left coordinates of a block with a bW*bH size, that is, x=0, . . . , bW−1, y=0, bH−1, and MVPREC indicates the accuracy of mvLX (1/MVPREC pixel accuracy). For example, MVPREC=16.

The motion compensation unit 3091 derives a temporary image temp[ ][ ] by performing horizontal interpolation processing on a reference picture refImg using an interpolation filter. In the equation below, $\Sigma$ is the sum of k with k=0, . . . , NTAP−1, shift1 is a normalization parameter for adjusting the range of values, and offset1=1<<(shift1−1).

$$temp[x][y]=(\Sigma mcFilter[xFrac][k]*refImg[xInt+k-NTAP/2+1][yInt]+offset1)>>shift1$$

Subsequently, the motion compensation unit 3091 derives an interpolation image Pred[ ][ ] by performing vertical interpolation processing on the temporary image temp[ ][ ]. In the equation below, $\Sigma$ is the sum of k with k=0, . . . , NTAP−1, shift2 is a normalization parameter for adjusting the range of values, and offset2=1<<(shift2−1).

$$Pred[x][y]=(\Sigma mcFilter[yFrac][k]*temp[x][y+k-NTAP/2+1]+offset2)>>shift2$$

Note that, in a case of bi-prediction, Pred[ ][ ] described above is derived for each L0 list and L1 list (referred to as interpolation images PredL0[ ][ ] and PredL1[ ][ ]), and an interpolation image Pred[ ][ ] is generated from PredL0[ ][ ] and PredL1[ ][ ].

Note that the motion compensation unit 3091 has a function of scaling an interpolation image in accordance with the scaling ratio RefPicScale[i][j][0] in the horizontal direction of the reference picture derived by the scale parameter derivation unit 30378 and the scaling ratio RefPicScale[i][j][1] in the vertical direction of the reference picture.

In a case that predMode indicates an intra prediction mode, the intra prediction image generation unit 310 performs intra prediction by using an intra prediction parameter input from the intra prediction parameter derivation unit 304 and a reference pixel read out from the reference picture memory 306.

The inverse quantization and inverse transform processing unit 311 (residual decoder) performs inverse quantization on a quantization transform coefficient input from the parameter decoder 302 to calculate a transform coefficient.

The inverse quantization and inverse transform processing unit 311 scales (inverse quantization) the quantization transform coefficient qd[ ][ ] input from the entropy decoder 301 through a scaling unit 31111 to obtain a transform coefficient d[ ][ ].

The scaling unit 31111 performs scaling by using a weight for each coefficient on the transform coefficient decoded by the TU decoder by using a quantization parameter and a scaling factor derived by the parameter decoder 302.

Here, a quantization parameter qP is derived as follows by using a color component cIdx of a target transform coefficient and a joint chroma residual coding flag tu_joint_cbcr_flag.

qP=qPY(cIdx==0)

qP=qPCb(cIdx==1&& tu_joint_cbcr_flag==0)

qP=qPCr(cIdx==2&& tu_joint_cbcr_flag==0)

qP=qPCbCr(tu_joint_cbcr_flag!=0)

The scaling unit 31111 derives a value rectNonTsFlag related to a size or a shape from a size (nTbW, nTbH) of a target TU.
rectNonTsFlag=(((Log 2(nTbW)+Log 2(nTbH)) & 1)==1 && transform_skip_flag[xTbY][yTbY]==0) transform_skip_flag is a flag indicating whether transform is to be skipped.

The scaling unit 31111 performs the following processing using ScalingFactor[ ][ ] derived by a scaling list decoder 3026 (not illustrated).

In a case that a scaling list is not enabled (scaling_list_enabled_flag==0) or transform skip is used (transform_skip_flag==1), the scaling unit 31111 sets m[x][y]=16. In other words, uniform quantization is performed. scaling_list_enabled_flag is a flag indicating whether the scaling list is enabled.

Otherwise (that is, in a case that scaling_list_enabled_flag==1 and transform_skip_flag==0), the scaling unit 31111 uses the scaling list. Here, m[ ][ ] is set as follows.

m[x][y]=ScalingFactor[Log 2(nTbW)][Log 2(nTbH)][matrixId][x][y]

Here, matrixId is set depending on the prediction mode of the target TU (CuPredMode), a color component index (cIdx), and whether a non-separable transform is applied (lfnst_idx).

In a case that sh_dep_quant_used_flag is 1, the scaling unit 31111 derives a scaling factor ls[x][y] according to the following equation.

ls[x][y]=(m[x][y]*quantScale[rectNonTsFlag][(qP+1)%6])<<((qP+1)/6)

Otherwise (sh_dep_quant_used_flag=0), the following equation may be used for the derivation.

ls[x][y]=(m[x][y]*quantScale[rectNonTsFlag][qP%6])<<(qP/6)

Here, quantScale[ ]={{40, 45, 51, 57, 64, 72}, {57, 64, 72, 80, 90, 102}}. sh_dep_quant_used_flag is a flag set to 1 in a case that dependent quantization is performed and set to 0 in a case that dependent quantization is not performed. The value of quantScale is derived from the value of x (x=0 . . . 6) through the following equation.

quantScale[x]=RoundInt(2^(6/(x−qsoffset)))

qsoffset=rectNonTsFlag==0?4:2

In a case that the value of qP is 4, quantScale is 64. Here, RoundInt is a function of adding a round constant (for example, 0.5) and rounding down numbers after the decimal point to obtain an integer.

The scaling unit 31111 derives dnc[ ][ ] from a product of a transform coefficient TransCoeffLevel decoded as the scaling factor ls[ ][ ], and thereby performs inverse quantization.

dnc[x][y]=(TransCoeffLevel[xTbY][yTbY][cIdx][x][y]*ls[x][y]+bdOffset1)>>bdShift1

Here, bdOffset1=1<<(bdShift1−1)

Finally, the scaling unit 31111 clips the inverse-quantized transform coefficient to derive d[x][y].

d[x][y]=Clip3(CoeffMin,CoeffMax,dnc[x][y])  (Equation CLIP-1)

CoeffMin and CoeffMax are a minimum value and a maximum value of clipping, respectively, and are derived according to the following equation.

CoeffMin=−(1<<log 2TransformRange)

CoeffMax=(1<<log 2TransformRange)−1

Here, log 2TransformRange is a value indicating the range of the transform coefficient derived in the method described below.

d[x][y] is transmitted to an inverse core transform processing unit 31123 or an inverse non-separable transform processing unit 31121. The inverse non-separable transform processing unit 31121 applies inverse non-separable transform to the transform coefficient d[ ][ ] after the inverse quantization and before core transform.

The addition unit 312 adds the prediction image of the block input from the prediction image generation unit 308 to the prediction error input from the inverse quantization and inverse transform processing unit 311 for each pixel to generate a decoded picture of the block. The addition unit 312 stores the decoded picture of the block in the reference picture memory 306, and also outputs the image to the loop filter 305.

The inverse quantization and inverse transform processing unit 311 performs inverse quantization on the quantization transform coefficient input from the parameter decoder 302 to calculate a transform coefficient.

The addition unit 312 adds the prediction image of the block input from the prediction image generation unit 308 to the prediction error input from the inverse quantization and inverse transform processing unit 311 for each pixel to generate a decoded picture of the block. The addition unit 312 stores the decoded picture of the block in the reference picture memory 306, and also outputs the image to the loop filter 305.

SEI for Post-Filtering Based on Neural Network

FIG. 9 illustrates the SEI syntax of for post-filtering based on a neural network.

nnrpf_id: The identification number of the neural network.

nnrpf_mode_idc: The index of the mode indicating a method of specifying a neural network model used for post-filtering. A value of 0 indicates that the neural network (NN) filter associated with nnrpf_id is not specified in the SEI message. A value of 1 indicates that the NN filter associated with nnrpf_id is a neural network model identified by a predetermined uniform resource identifier (URI). The URI is a character string for identification indicating a logical or physical resource. Note that actual data does not need to be present at the location indicated by the URI as long as the character string can specify the resource. A value of 2 indicates that the NN filter associated with nnrpf_id is a neural network model represented by the ISO/IEC 15938-17 bit stream included in this SEI message. A value of 3 indicates that the NN filter associated with nnrpf_id is a neural network model updated by the ISO/IEC 15938-17 bit stream identified by the NN filter SEI message used in previous decoding and included in the SEI message.

nnrpf_purpose indicates the purpose of post-filtering. A value of nnrpf_purpose being 0 indicates the purpose being image quality improvement through post-filtering. A value of nnrpf_purpose being 1 indicates that chroma format conversion is performed. Specifically, a case that resolution conversion of a chroma signal is performed to convert a 4:2:0 format into a 4:4:4 format is indicated. A value of nnrpf_purpose being 2 indicates a case that the image size is increased by converting the resolution of the image through post-filtering.

nnrpf_out_sub_c_idc indicates the difference between the chroma-format indication value of the output image and ChromaFormatIdc of the input image. The value of the difference must be in the range from 0 to 3-ChromaFormatIdc. In a case of chroma sampling associated with luma sampling of the output image, the display variable OutputChromaFormatIDC in the chroma format is derived as follows.

OutputChromaFormatIdc=ChromaFormatIdc+
nnrpf_out_sub_c_idc

In a case that the value of OutputChromaFormatIdc is 0, the output is monochrome images, and for the variables outSubWidthC and outSubHeightC,
outSubWidthC=1
outSubHeightC=1
are set.

In a case that the value of OutputChromaFormatIdc is 1, the output is a 4:2:0 format image, and for the variables outSubWidthC and outSubHeightC,
outSubWidthC=2
outSubHeightC=2
are set.

In a case that the value of OutputChromaFormatIdc is 2, the output is a 4:2:2 format image, and for the variables outSubWidthC and outSubHeightC,
outSubWidthC=2
outSubHeightC=1
are set.

In a case that the value of OutputChromaFormatIdc is 3, the output is a 4:4:4 format image, and for the variables outSubWidthC and outSubHeightC,
outSubWidthC=1
outSubHeightC=1
are set.

nnrpf_patch_size_minus1+1 indicates the number of pixels in the horizontal and vertical directions of a patch of the unit of post-filtering operations.

nnrpf_overlap*2+nnrpf_patch_size_minus1+1 indicates the number of horizontal and vertical pixels of each input tensor of post-filtering. The value of nnrpf_overlap ranges from 0 to 16383. The patch is a block obtained by dividing a picture, and is input to the input tensor by overlapping pixels in the left, right, upper, and lower directions using the value of nnrpf_overlap.

In a case that there are nnrpf_pic_width_in_luma_samples and nnrpf_pic_height_in_luma_samples, they specify the width and height, respectively, of the luma pixel array of the image resulting from applying the post-filtering identified by nnrpf_id to the decoded picture.

NPL 2 defines the image size after resolution conversion in a case that the resolution conversion is performed with post-filtering. Although NPL 3 defines a patch size which is a processing unit of a neural network, a relationship between the patch size and an input/output image size is not clear. For this reason, a problem may occur in input and output in processing by the neural network. Therefore, in the present embodiment, each variable is set as follows.

The variables patchWidth and patchHeight representing the sizes of an input patch in the horizontal direction and vertical direction, the variables outPatchWidth and outPatchHeight representing the sizes of an output patch in the horizontal direction and vertical direction, the variables outPatchCWidth and outPatchCHeight representing the sizes of the output chroma signal patch in the horizontal direction and vertical direction, and the variable overlapSize representing the size of overlap are derived as follows.

patchWidth=nnrpf_patch_size_minus1+1 patchHeight=nnrpf_patch_size_minus1+1 outPatchWidth=
(nnrpf_pic_width_in_luma_samples*patchWidth)/
PicWidthInLumaSamples outPatchHeight=
(nnrpf_pic_height_in_luma_samples*patchHeight)/
PicHeightInLumaSamples)

outPatchCWidth=outPatchWidth*InpSubWidth$C$/
outSubWidth$C$ outPatchCHeight=outPatchHeight*InpSubHeight$C$/
outSubHeight$C$ overlapSize=nnrpf_overlap Here, the value of outPatchWidth*PicWidthInLumaSamples is set equal to the value of nnrpf_pic_width_in_luma_samples*patchWidth. The value of outPatchHeight*PicHeightInLumaSamples is set equal to the value of nnrpf_pic_height_in_luma_samples*patchHeight.

This constraint is equivalent to equating the ratio of PicWidthInLumaSamples to nnrpf_pic_width_in_luma_samples and the ratio of patchWidth to outPatchWidth, and equating the ratio of PicHeightInLumaSamples to nnrpf_pic_height_in_luma_samples and the ratio of patchHeight to outPatchHeight.

By restricting the values of the variables, the decoded picture size, the post-filtered image size, and the patch size as described above, processing can be performed without failure even in a case that the resolution conversion is performed with post-filtering.

nnrpf_io_order_idc indicates a method of inputting/outputting a decoded picture to/from a tensor of a neural network for post-filtering.

In a case that the value of nnrpf_io_order_idc is 0, only the luma component of one channel is input to and output from the input and output tensors.

In a case that the value of nnrpf_io_order_idc is 1, only the chroma components of two channels are input to and output from the input and output tensors.

In a case that the value of nnrpf_io_order_idc is 2, the luma component of one channel and the chroma components of two channels are input to and output from the input and output tensors.

In a case that the value of nnrpf_io_order_idc is 3, four luma channels, two chroma channels, and a quantization parameter channel are input to and output from the input and output tensors as illustrated in FIG. 10.

FIG. 10 is a diagram illustrating input/output processing of image data to/from a neural network that performs post-filtering.

In a case that the value of nnrpf_io_order_idc is 0, the input tensor inputTensor first calls and inputs InputTensors( ) to which only the luma component of one channel is input for each patch size with reference to the luma image size as indicated by the code in FIG. 10. Next, PostProcessingFilter(inputTensor) for performing post-filtering is performed. Finally, the output tensor outputTensor of the luma component of one channel is output as an output image in OutputTensors(OutputTensor). Here, the values of the variables cTop and cLeft indicate the coordinate in the vertical direction and the coordinate in the horizontal direction of the top left side of the luma image data.

In a case that the value of nnrpf_io_order_idc is 1, the input tensor inputTensor first calls and inputs InputTensors( ) of the chroma component of two channels for each patch size with reference to the chroma image size obtained by dividing the luma image size by InpSubHeightC or InpSubWidth as indicated by the code in FIG. 10. Next, PostProcessingFilter(inputTensor) for performing post-filtering is performed. Finally, the output tensor outputTensor of the chroma component of two channels is output as an output image in OutputTensors( ). Here, the values of the variables cTop and cLeft indicate the coordinate in the vertical direction and the coordinate in the horizontal direction of the top left side of the chroma image data.

In a case that the value of nnrpf_io_order_idc is 2, the input tensor inputTensor first calls and inputs InputTensors( ) to which the luma component of one channel and the chroma component of two channels are input for each patch size with reference to the luma image size as indicated by the code in FIG. 10. Next, PostProcessingFilter (inputTensor) for performing post-filtering is performed. Finally, the output tensor outputTensor of the luma component of the one channel and the chroma component of the two channels is output as an output image in OutputTensors( ). Here, the values of the variables cTop and cLeft indicate the coordinate in the vertical direction and the coordinate in the horizontal direction of the top left side of the luma image data.

In a case that the value of nnrpf_io_order_idc is 3, the inputTensor first calls and inputs InputTensors( ) to which the luma component of four channels and the chroma component of two channels are input for every patch size being a multiple of two with reference to the luma image size as indicated by the code in FIG. 10. Next, PostProcessingFilter(inputTensor) for performing post-filtering is performed. Finally, the output tensor outputTensor of the luma component of the four channels and the chroma component of the two channels is output as an output image in OutputTensors( ). Here, the values of the variables cTop and cLeft indicate the coordinate in the vertical direction and the coordinate in the horizontal direction of the top left side of the luma image data.

FIG. 11 is a diagram illustrating the processing content of InputTensors( ) that performs processing of inputting image data to the input tensor of the neural network that performs post-filtering.

In a case that the value of nnrpf_io_order_idc is 0, the input tensor inputTensor inputs only the luma component of one channel as indicated by the code in FIG. 11. Here, the size of the input tensor inputTensor in the horizontal direction is patchWidth+2*overlapSize, the size thereof in the vertical direction is patchHeight+2*overlapSize, and pixel values corresponding to overlapSize are overlapped on vertically and horizontally adjoining patches and input.

At this time, the function InpY is assumed to be a function for converting the pixel value of the luma signal of the decoded picture into the type of the variable of the input tensor. The function InpC is assumed to be a function for converting the pixel value of the chroma signal of the decoded picture into the type of the variable of the input tensor.

In a case that the value of nnrpf_io_order_idc is 1, the input tensor inputTensor inputs the chroma component of two channels as indicated by the code in FIG. 11. Here, the size of the input tensor inputTensor in the horizontal direction is patchWidth+2*overlapSize, the size thereof in the vertical direction is patchHeight+2*overlapSize, and pixel values corresponding to overlapSize are overlapped on vertically and horizontally adjoining patches and input.

In a case that the value of nnrpf_io_order_idc is 2, the input tensor inputTensor inputs the luma component of one channel and the chroma component of two channels as indicated by the codes in FIG. 11. Here, the size of the input tensor inputTensor in the horizontal direction is patchWidth+2*overlapSize, the size thereof in the vertical direction is patchHeight+2*overlapSize, and pixel values corresponding to overlapSize are overlapped on vertically and horizontally adjoining patches and input.

In the case of the 4:2:0 format, the chroma signal is half of the number of pixels of the luma signal in both the horizontal and vertical directions, and the values of InpSubWidthC and InpSubHeight are 2. In this case, corresponding chroma pixels are input to the luma pixel positions, and in a case that there are no corresponding pixels, the chroma pixels at the nearest neighbor positions adjoining to the left or upper side are input to the input tensor.

In the case of the 4:2:2 format, the chroma signal is half of the number of pixels of the luma signal in the horizontal direction, and the value of InpSubWidthC is 1 and the value of InpSubHeight is 2. In this case, corresponding chroma pixels are input to the luma pixel positions, and in a case that there are no corresponding pixels, the chroma pixels at the nearest neighbor positions adjoining to the left are input to the input tensor.

In the case of the 4:4:4 format, the chroma signal has the same number of pixels as the luma signal, and the values of both InpSubWidthC and InpSubHeight is 1. In this case, the chroma pixels corresponding to the luma pixel positions are input to the input tensor.

In a case that the value of nnrpf_io_order_idc is 3, the input tensor inputTensor inputs values obtained by converting the luma component of four channels, the chroma component of two channels, and quantization parameters as indicated by the code in FIG. 11. Here, the size of the input tensor inputTensor in the horizontal direction is patchWidth+2*overlapSize, the size thereof in the vertical direction is patchHeight+2*overlapSize, and pixel values corresponding to overlapSize are overlapped on vertically and horizontally adjoining patches and input.

In the case of the 4:2:0 format, the luma signal is sampled for each pixel in each of the horizontal direction and the vertical direction and divided into four to generate four channels. Note that in the case of the 4:2:2 format, the chroma signals may be sampled for each pixel in the vertical direction to generate chroma components of the four channels.

FIG. 12 is a diagram illustrating the content of processing of OutputTensors( ) to perform processing of outputting post-filtered image data from the output tensor of the neural network that performs post-filtering.

At this time, a function OutY is a function for converting the type of the variable of the output tensor into the pixel value of the luma signal. A function OutC is a function for converting the type of the variable of the output tensor into the pixel value of the chroma signal.

In a case that the value of nnrpf_io_order_idc is 0, the output tensor outputTensor outputs the luma component of one channel as indicated by the code in FIG. 12. Here, the size of the output tensor outputTensor in the horizontal direction is outPatchWidth, and the size thereof in the vertical direction is outPatchHeight. The post-filtered luma signal of the luma image in the range of a width nnrpf_pic_width_in_luma_samples and a height nnrpf_pic_height_in_luma_samples is output to the output image buffer FilteredYPic, the luma image resulting from applying the post-filtering to the decoded picture.

In a case that the value of nnrpf_io_order_idc is 1, the output tensor outputTensor outputs the chroma component of two channels as indicated by the code in FIG. 12. Here, the size of the output tensor outputTensor in the horizontal direction is outPatchWidth, and the size thereof in the vertical direction is outPatchHeight. The post-filtered chroma signal of the chroma image in the range of a width nnrpf_pic_width_in_luma_samples/outSubWidthC and a height nnrpf_pic_height_in_luma_samples/outSubHeightC is output to the output image buffer FilteredCPic, the chroma image resulting from applying the post-filtering to the decoded picture.

In a case that the value of nnrpf_io_order_idc is 2, the output tensor outputTensor outputs the luma component of one channel and the chroma component of two channels as indicated by the code in FIG. 12. Here, the size of the output tensor outputTensor in the horizontal direction is outPatchWidth, and the size thereof in the vertical direction is outPatchHeight. The post-filtered luma signal of the luma image in the range of a width nnrpf_pic_width_in_luma_samples and a height nnrpf_pic_height_in_luma_samples is output to the output image buffer FilteredYPic, the luma signal resulting from applying the post-filtering to the decoded picture, and at the same time, the post-filtered chroma signal is output to the output image buffer FilteredCPic of the chroma signal.

In a case that the value of nnrpf_io_order_idc is 3, the output tensor outputTensor outputs the luma component of four channel and the chroma component of two channels as indicated by the code in FIG. 12. Here, the size of the output tensor outputTensor in the horizontal direction is outPatchWidth, and the size thereof in the vertical direction is outPatchHeight. The post-filtered luma signal of the luma image in the range of a width nnrpf_pic_width_in_luma_samples and a height nnrpf_pic_height_in_luma_samples is output to the output image buffer FilteredYPic, the luma image resulting from applying the post-filtering to the decoded picture, and at the same time, the post-filtered chroma signal is output to the output image buffer FilteredCPic of the chroma signal.

nnrpf_reserved_zero_bit shall be 0. SEI bit streams are input for byte alignment.

nnrpf_uri[i] includes an i-byte character terminated with NULL of a character code of UTF-8 defined in ITEF Internet Standard 63 of i bytes. The UTF-8 character code string contains URI with the syntax and semantics indicated in IETF Internet Standard 66 that identifies the neural network used in post-filtering.

nnrpf_payload_byte[i] contains the i-th byte of the bit stream conforming to ISO/IEC15938-17. The byte string of nnrpf_payload_byte[i] is a bit stream conforming to ISO/IEC15938-17.

Another Example 1 of SEI for Post-Filtering Based on Neural Network

Another embodiment of SEI for post-filtering based on a neural network will be illustrated.

FIG. 13 illustrates another syntax example 1 of SEI for post-filtering based on a neural network. Hereinafter, the same syntax elements as those already described with reference to FIG. 9 will not be described.

nnrpf_component_last_flag is a flag indicating whether each channel is stored so as to be the last dimension in the input tensor and the output tensor of post-filtering. In a case that nnrpf_component_last_flag is 0, each channel is stored in the second dimension of the tensor, and in a case that it is 1, the channel is stored in the last dimension.

nnrpf_inp_sample_idc indicates a method of converting a pixel value of a decoded picture into an input value for post-filtering. In a case that values of nnrpf_inp_sample_idc are 0, 1, 2, and 3, input values for post-filtering are binary 16, binary 32, binary 64, and binary 128, respectively. These are floating-point numbers defined in IEEE 754-2019. At this time, the functions InpY, InpC and InpQP are defined as follows:

$$InpY(x) = x \div ((1 << BitDepthY) - 1)$$

$$InpC(x) = x \div ((1 << BitDepthC) - 1)$$

$$InpQP(x) = 2^{((x-42)/6)}$$

Note that the operator ÷ represents division with decimal accuracy (numbers after the decimal point in the quotient are not rounded down). BitDepthY and BitDepthC are the bit-depth of the luma component and the bit-depth of the chroma component of the decoded picture, respectively.

In a case that values of nnrpf_inp_sample_idc are 4, 5, and 6, the input values to the post-filtering are an 8-bit unsigned integer, a 16-bit unsigned integer, and a 32-bit unsigned integer, respectively. At this time, the functions InpY, InpC and InpQP are defined as follows:

In a case that inpTensorBitDepth>=BitDepthY, $$InpY(x) = x << (inpTensorBitDepth - BitDepthY)$$

Otherwise, $$InpY(x) = Clip3(0, (1 << inpTensorBitDepth) - 1, (x + (1 << (shift-1))) >> shift)$$

where, in a case that shift=BitDepthY−inpTensorBitDepth inpTensorBitDepth>=BitDepthC, $$InpC(x) = x << (inpTensorBitDepth - BitDepthC)$$

Otherwise, $$InpC(x) = Clip3(0, (1 << inpTensorBitDepth) - 1, (x + (1 << (shift-1))) >> shift)$$

where shift=BitDepthC−inpTensorBitDepth

InpQP(x)=x inpTensorBitDepth is the bit-depth of the pixel value in the input tensor.

The functions InpY, InpC, and InpQP are used to set input values for the input tensor. FIG. 11 includes examples of use of InpY and InpC. As described above, by switching the functions InpY and InpC for converting the input value according to the data type, the value range of the input value can be appropriately converted and input for the post-filtering. Note that in the case of nnrpf_io_order_idc=3 illustrated in FIG. 11, the value of QP is input using the input tensor. In a case that InpQP is used as a transform function at this time, a transform equation corresponding to the type of the input tensor can be applied. For example, instead of the formula inputTensor[0][6][yP+overlapSize][xP+
    overlapSize]=2$^{(SliceQPY-42)/6}$ in FIG. 11, inputTensor[0][6][yP+overlapSize][xP+
    overlapSize]=InpQP(SliceQPY) may be applied.

Only a right shift may be performed as follows, instead of performing the rounding right shift as in the above example:
In a case that inpTensorBitDepth>=BitDepthY, InpY(x)=x<<(inpTensorBitDepth−BitDepthY)

Otherwise,

InpY(x)=x>>(BitDepthY−inpTensorBitDepth)

In a case that inpTensorBitDepth>=BitDepthC,

InpC(x)=x<<(inpTensorBitDepth−BitDepthC)

Otherwise,

InpC(x)=x>>(BitDepthC−inpTensorBitDepth)

nnrpf_inp_tensor_bitdepth_minus8+8 indicates the bit-depth of the input value to the integer input tensor. inpTensorBitDepth is obtained as follows:

inpTensorBitDepth=nnrpf_inp_tensor_bitdepth_minus8+8 nnrpf_inp_tensor_bitdepth_minus8 is coded in a case that the input value of the input tensor is an integer type greater than 8-bit unsigned integer. In a case that the input value of the input tensor is an 8-bit unsigned integer (nnrpf_inp_sample_idc is 4), nnrpf_inp_tensor_bitdepth_minus8=0 is set. In a case that the input value of the input tensor is a 16-bit unsigned integer or a 32-bit unsigned integer (nnrpf_inp_sample_idc is 5 or 6), the value range of nnrpf_inp_tensor_bitdepth_minus8 is 0 to 8 or 0 to 24, respectively.

Other numerical values such as minus1 and minus4 may be used, instead of minus8. For example, in a case that the minimum bit-depth is set to X bits, nnrpf_inp_tensor_bitdepth_minusX is used as a syntax element, and inpTensorBitDepth is obtained as follows:

inpTensorBitDepth=nnrpf_inp_tensor_bitdepth_minusX+X nnrpf_inp_tensor_bitdepth_minusX is coded in a case that the input value of the input tensor is an integer type greater than X-bit unsigned integer.

nnrpf_inp_order_idc indicates a method of arranging the pixel array of a decoded picture as an input to post-filtering.

nnrpf_out_sample_idc indicates the type of the output value of the post-filtering. In a case that values of nnrpf_inp_sample_idc are 0, 1, 2, and 3, input values for post-filtering are binary 16, binary 32, binary 64, and binary 128, respectively. These are floating-point numbers defined in IEEE 754-2019. At this time, the functions OutY and OutC are defined as follows:

OutY(x)=Clip3(0,(1<<BitDepthY)−1,Round(x*
    ((1<<BitDepthY)−1)))

OutC(x)=Clip3(0,(1<<BitDepthC)−1,Round(x*
    ((1<<BitDepthC)−1)))

BitDepthY and BitDepthC are the bit-depth of the luma component and the bit-depth of the chroma component of the decoded picture, respectively.

In a case that values of nnrpf_inp_sample_idc are 4, 5, and 6, the input values to the post-filtering are an 8-bit unsigned integer, a 16-bit unsigned integer, and a 32-bit unsigned integer, respectively. At this time, the functions InpY, InpC and InpQP are defined as follows:
In a case that outTensorBitDepth>=BitDepthY, OutY(x)=x<<(outTensorBitDepth−BitDepthY)

Otherwise,

OutY(x)=Clip3(0,(1<<outTensorBitDepth)−1,(x+(1<<
    (shift−1)))>>shift)

where, in a case that shift=BitDepthY−outTensorBitDepth outTensorBitDepth>=BitDepthC, OutC(x)=x<<(outTensorBitDepth−BitDepthC)

Otherwise,

OutC(x)=Clip3(0,(1<<outTensorBitDepth)−1,(x+(1<<
    (shift−1)))>>shift)

where shift=BitDepthC−outTensorBitDepth
outTensorBitDepth is the bit-depth of the output value in the output tensor.

The functions OutY and OutC are used to obtain output values from the output tensor. FIG. 12 includes examples of use of OutY and OutC. As described above, by switching the processing of the functions OutY and OutC for converting the output value according to the data type, the value range of the output value can be appropriately converted and acquired.

nnrpf_out_tensor_bitdepth_minus8+8 indicates the bit-depth of the output value in the integer output tensor. outTensorBitDepth is obtained as follows:

outTensorBitDepth=nnrpf_out_tensor_bitdepth_minus8+8

In a case that the output value of the output tensor is an 8-bit unsigned integer (nnrpf_out_sample_idc is 4), nnrpf_out_tensor_bitdepth_minus8 is not coded and nnrpf_out_tensor_bitdepth_minus8=0 is set. In a case that the output value of the output tensor is a 16-bit unsigned integer or a 32-bit unsigned integer (nnrpf_out_sample_idc is 5 or 6), the value range of nnrpf_out_tensor_bitdepth_minus8 is 0 to 8 or 0 to 24, respectively.

Note that without using nnrpf_inp_tensor_bitdepth_minus8 and nnrpf_out_tensor_bitdepth_minus8, the following may be derived from one syntax element nnrpf_tensor_bitdepth_minus8 as follows:

inpTensorBitDepth=nnrpf_tensor_bitdepth_minus8+8 outTensorBitDepth=nnrpf_tensor_bitdepth_minus8+8

At this time, nnrpf_tensor_bitdepth_minus8 is coded in a case that either the input tensor or the output tensor is an integer type and either of them is a type greater than an 8-bit unsigned integer.

Other numerical values indicating a minimum bit-depth such as minus1 or minus4 may be used, instead of minus8, similarly to the input bit-depth.

nnrpf_out_order_idc indicates how output values of post-filtering are arranged.

nnrpf_constant_patch_size_flag indicates whether a patch (processing unit) of post-filtering has a fixed size. In a case that nnrpf_constant_patch_size_flag is 1, patchWidth and patchHeight representing the width and height of the processing unit of the post-filtering are set equal to the widths and heights indicated by the following two syntax elements:

patchWidth=nnrpf_patch_width_minus1+1 patchHeight=nnrpf_patch_height_minus1+1

In a case that nnrpf_constant_patch_size_flag is 0, patchWidth and patchHeight are set to values arbitrarily determined by an apparatus (the NN filter unit 611) that performs post-filtering. For example, the input tensor width−2*overlapSize, the input tensor height−2*overlapSize, and overlapSize=8 performed by the NN filter unit 611 may be used.

nnrpf_patch_width_minus1+1 indicates the width in a case that the patch has a fixed size.

nnrpf_patch_height_minus1+1 indicates the height in the case that the patch has a fixed size.

Note that the values of nnrpf_inp_sample_idc and nnrpf_out_sample_idc are not limited to the values described above and other values may be assigned thereto. A type not included in the above description may be selected. For example, a 64-bit unsigned integer or signed integer may be assigned to nnrpf_inp_sample_idc=7 and nnrpf_out_sample_idc=7.

As described above, it is possible to appropriately convert the bit-depth between the input pixel to the neural network, the input tensor, the output tensor, and the pixel value of the post-filtered output image.

As a modification, patchWidth, patchHeight, and overlapSize may be values arbitrarily determined by an apparatus (the NN filter unit 611) that performs post-filtering regardless of syntax variable values. Values are as described above.

As a modification, the bit-depth of the output value of the output tensor may be used as the output image without conversion. At this time, the functions OutY and OutC are as follows:

OutY(x)=x

OutC(x)=x

Alternatively, the function call may be omitted.

With the above-described configuration, it is possible to acquire an output image in which the bit-depth of the output value is maintained.

Another Example 2 of SEI for Post-Filtering Based on Neural Network

Another embodiment of SEI for post-filtering based on a neural network will be illustrated.

FIG. 14 illustrates another syntax example 2 of SEI for post-filtering based on a neural network. Hereinafter, the same syntax elements as those already described will not be described.

nnrpf_inp_tensor_bitdepth_delta indicates the bit-depth of the input value to the integer input tensor. inpTensorBitDepth is obtained as follows:

inpTensorBitDepth=(nnrpf_inp_sample_idc==4)
?nnrpf_inp_tensor_bitdepth_delta+1:
(nnrpf_inp_sample_idc==5)?nnrpf_inp_
tensor_bitdepth_delta+9: (nnrpf_inp_sample_idc==6)?nnrpf_inp_tensor_bitdepth_delta+
17

Alternatively, inpTensorBitDepth may be obtained in this way:

inpTensorBitDepth=nnrpf_inp_tensor_bitdepth_delta+
1+(nnrpf_inp_sample_idc−4): (nnrpf_inp_sample_idc==5)?nnrpf_inp_tensor_bitdepth_delta+9:
(nnrpf_inp_sample_idc==6)?nnrpf_inp_
tensor_bitdepth_delta+17

In a case that values of nnrpf_inp_sample_idc are 4, 5, and 6, the ranges of nnrpf_inp_tensor_bitdepth_delta are 0 to 7, 0 to 15, and 0 to 15, respectively. A minimum value that a bit-depth can take is changed according to an integer type that an input value takes, and the difference from the minimum value is coded. Thus, the code amount for representing the bit-depth can be reduced while the range of the bit-depth can be widely used.

nnrpf_out_tensor_bitdepth_delta indicates the bit-depth of the output value of the integer output tensor. outTensorBitDepth is obtained as follows:

outTensorBitDepth=(nnrpf_out_sample_idc==4)
?nnrpf_out_tensor_bitdepth_delta+1:
(nnrpf_out_sample_idc==5)?nnrpf_out_
tensor_bitdepth_delta+9: (nnrpf_out_sample_idc==6)?nnrpf_out_tensor_bitdepth_delta+
17

In a case that values of nnrpf_out_sample_idc are 4, 5, and 6, the ranges of nnrpf_out_tensor_bitdepth_delta are 0 to 7, 0 to 15, and 0 to 15, respectively. Thus, the code amount for representing the bit-depth can be reduced while the range of the bit-depth can be widely used, similarly to nnrpf_out_tensor_bitdepth_delta.

Another Example 3 of SEI for Post-Filtering Based on Neural Network

Another embodiment of SEI for post-filtering based on a neural network will be illustrated.

FIG. 15 illustrates another syntax example 3 of SEI for post-filtering based on a neural network. Hereinafter, the same syntax elements as those already described will not be described.

Although nnrpf_inp_tensor_bitdepth_luma_minus8 and nnrpf_inp_tensor_bitdepth_luma_minus8 are values indicating the bit-depth of the integer input tensor, similarly to nnrpf_inp_tensor_bitdepth_minus8, the elements indicate only the bit-depth of the value of the luma signal and the bit-depth of the value of the chroma signal, respectively. The bit-depths inpTensorBitDepthY and inpTensorBitDepthC of the value of the luma signal and the value of the chroma signal for the input tensor are obtained as follows:

inpTensorBitDepthY=nnrpf_inp_tensor_bitdepth_luma_minus8+8 inpTensorBitDepthC=nnrpf_inp_tensor_bitdepth_chroma_minus8+8

At this time, the functions InpY and InpC for the integer input tensor are defined as follows:

In a case that inpTensorBitDepthY>=BitDepthY,

InpY(x)=x<<(inpTensorBitDepthY−BitDepthY)

Otherwise,

InpY(x)=Clip3(0,(1<<inpTensorBitDepthY)−1,(x+
(1<<(shift−1)))>>shift)

where, in a case that shift=BitDepthY−inpTensorBit-DepthY inpTensorBitDepthC>=BitDepthC, $$InpC(x)=x<<(inpTensorBitDepthC-BitDepthC)$$

Otherwise, $$InpC(x)=\text{Clip3}(0,(1<<inpTensorBitDepthC)-1,(x+(1<<(shift-1)))>>shift)$$

where shift=BitDepthC−inpTensorBitDepthC

Although nnrpf_out_tensor_bitdepth_luma_minus8 and nnrpf_out_tensor_bitdepth_luma_minus8 are values indicating the bit-depth of the integer output tensor, similarly to nnrpf_out_tensor_bitdepth_minus8, the elements indicate only the bit-depth of the value of the luma signal and the bit-depth of the value of the chroma signal, respectively. The bit-depths outTensorBitDepthY and outTensorBitDepthC of the value of the luma signal and the value of the chroma signal for the output tensor are obtained as follows:

$$outTensorBitDepthY=nnrpf\_out\_tensor\_bitdepth\_luma\_minus8+8$$

$$outTensorBitDepthC=nnrpf\_out\_tensor\_bitdepth\_chroma\_minus8+8$$

At this time, the functions OutY and OutC for the integer output tensor are defined as follows:
In a case that outTensorBitDepthY>=BitDepthY, $$OutY(x)=x<<(outTensorBitDepthY-BitDepthY)$$

Otherwise, $$OutY(x)=\text{Clip3}(0,(1<<outTensorBitDepthY)-1,(x+(1<<(shift-1)))>>shift)$$

where shift=BitDepthY−outTensorBitDepthY

With the above-described configuration, support is possible for an embodiment in which the bit-depth of the value of a luma signal is different from that of the value of a chroma signal.

Another Example 4 of SEI for Post-Filtering Based on Neural Network

Another embodiment of SEI for post-filtering based on a neural network will be illustrated. This embodiment is an example in which the input tensor and the output tensor have the same data type and the same bit-depth.

FIG. 16 illustrates another syntax example 4 of SEI for post-filtering based on a neural network. Hereinafter, the same syntax elements as those already described will not be described.

nnrpf_sample_idc indicates the data type of the input and output tensors. The data type indicated by a value is the same as nnrpf_inp_sample_idc or the like described above. nnrpf_inp_sample_idc and nnrpf_out_sample_idc are set equal to the value of nnrpf_sample_idc.

nnrpf_tensor_bitdepth_minus8+8 indicates the bit-depth of the input values of the input and output tensors. inpTensorBitdepth and outTensorBitDepth are set as follows:

$$inpTensorBitDepth=nnrp\_tensor\_bitdepth\_minis8+8$$

$$outTensorBitDepth=nnrp\_tensor\_bitdepth\_minis8+8$$

With the above-described configuration, coding efficiency can be improved in an embodiment in which the input tensor and the output tensor are of the same type.

Another Example 5 of SEI for Post-Filtering Based on Neural Network

Another embodiment of SEI for post-filtering based on a neural network will be illustrated. This embodiment is an example in which the input tensor and the output tensor have the same data type and the same bit-depth.

FIG. 17 illustrates another syntax example 5 of SEI for post-filtering based on a neural network. Hereinafter, the same syntax elements as those already described will not be described.

nnrpf_inp_sample_idc indicates a method of converting a sample value of a decoded picture into an input value for post-filtering. In a case that values of nnrpf_inp_sample_idc are 0, 1, 2, and 3, input values for post-filtering are binary 16, binary 32, binary 64, and binary 128, respectively. These are floating-point numbers defined in IEEE 754-2019. At this time, the functions InpY, InpC and InpQP are defined as follows:

$$InpY(x)=x \div ((1<<BitDepthY)-1)$$

$$InpC(x)=x \div ((1<<BitDepthC)-1)$$

$$InpQP(x)=2^{((x-42)/6)}$$

BitDepthY and BitDepthC are the bit-depth of the luma component and the bit-depth of the chroma component of the decoded picture, respectively. For example, in a case that nnrpf_inp_sample_idc is 4 to 28, the input values to the post-filtering are (nnrpf_imp_sample_idc−4+8) bit unsigned integers, respectively. At this time, the bit-depth inpTensorBitDepth of the input tensor is defined as follows:

$$inpTensorBitDepth=nnrpf\_inp\_sample\_idc-4+8$$

The functions InpY and InpC are as described in the other example 1 above.

With the above-described configuration, the syntax can be simplified.

Decoding of SEI and Post-Filtering

The header decoder 3020 decodes network model complexity information from a defined SEI message. SEI is additional information of processing related to decoding, display, and the like.

Figure 18:
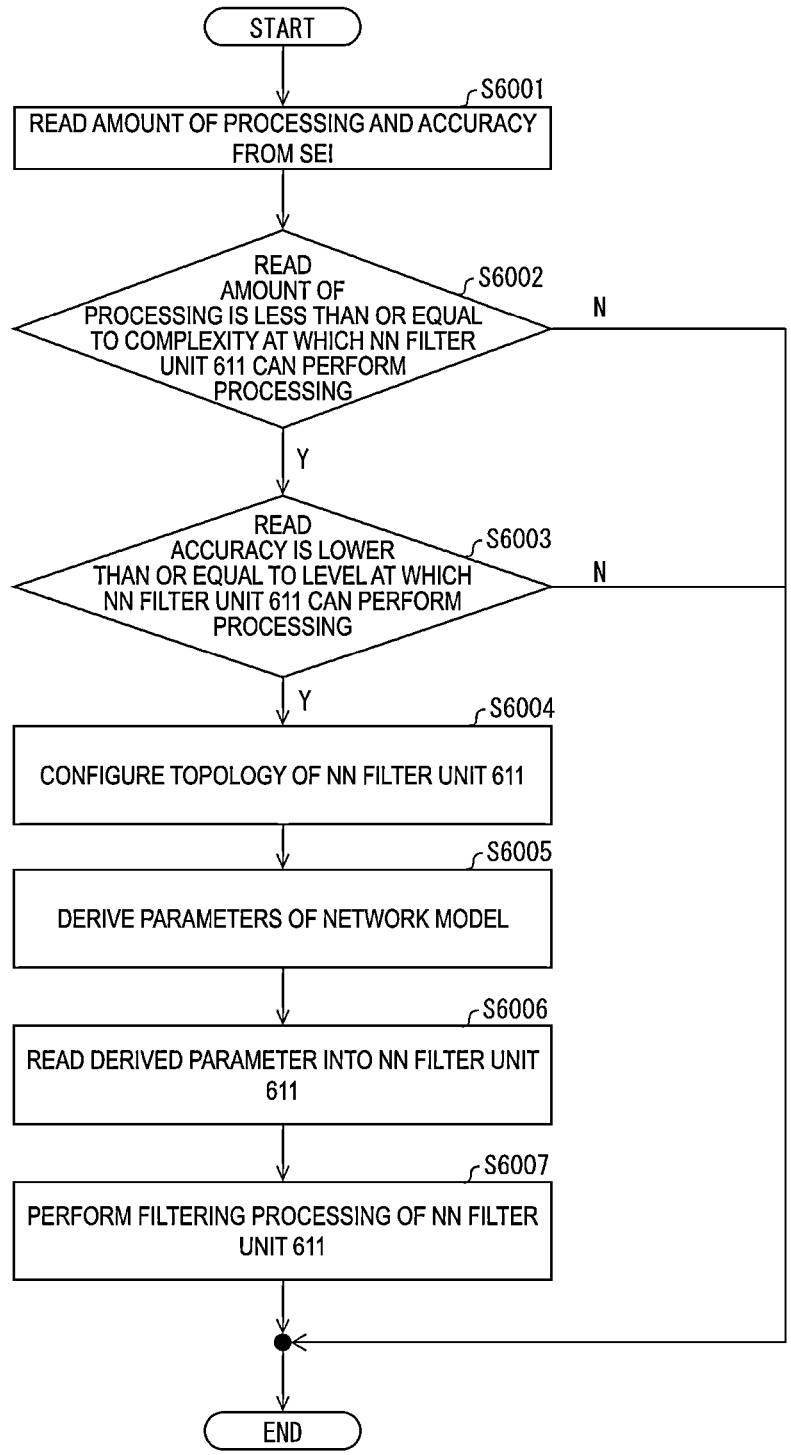
FIG. 18 is a diagram illustrating a flowchart of processing of a NN filter unit 611.

FIG. 18 is a diagram illustrating a flowchart of processing of the NN filter unit 611. The NN filter unit 611 performs the following processing in accordance with the parameters of the SEI message.

S6001: An amount of processing and accuracy are read from network model complexity information of SEI.

S6002: In a case that the complexity exceeds the level at which the NN filter unit 611 can perform processing, the processing ends. In a case that the complexity does not exceed the level, the processing proceeds to S6003.

S6003: In a case that the accuracy exceeds the level at which the NN filter unit 611 can perform processing, the processing ends. In a case that the complexity does not exceed the level, the processing proceeds to S6004.

S6004: A network model is specified from the SEI and the topology of the NN filter unit 611 is configured.

S6005: Parameters of the network model are derived from update information of the SEI.

S6006: The derived parameters of the network model are read into the NN filter unit 611.

S6007: Filtering of the NN filter unit 611 is performed and the result is output to an external destination.

However, SEI is not necessarily required for construction of luma samples and chroma samples in the decoding processing.

Configuration Example of NN Filter Unit 611

FIG. 19 is a diagram illustrating a configuration example of an interpolation filter, a loop filter, and a post-filter using a neural network filter unit (NN filter unit 611). Although an example of the post-filter will be described below, an interpolation filter or a loop filter may be used.

A post-processing unit 61 after the video decoding apparatus includes the NN filter unit 611. In a case that an image of the reference picture memory 306 is output, the NN filter unit 611 performs filtering and outputs the image to an external destination. The output image may be displayed, written into a file, re-coded (transcoded), transmitted, and the like. The NN filter unit 611 is a unit that performs filtering on an input image using a neural network model. At the same time, the image may have the same size or may be reduced or enlarged by rational number of times.

Here, a neural network model (hereinafter referred to as a NN model) means elements and connectivity (topology) of a neural network, and parameters (weights and biases) of the neural network. Note that the topology may be fixed, and only the parameters of the neural network model may be switched as well.

NN Filter Unit 611 in Detail

The NN filter unit performs filtering by a neural network model by using the input image inputTensor and input parameters (for example, QP, bS, and the like). The input image may be an image for each component or may be an image having a plurality of components as channels. The input parameters may be allocated to a channel different from that of the image.

The NN filter unit may repeatedly apply the following processing.

The NN filter unit performs a convolution (cony) operation on the inputTensor with the kernel k[m][i][j], and derives an output image outputTensor to which bias is added. Here, nn=0, . . . n−1, xx=0, . . . width−1, yy=0 . . . height−1.

In a case of outputTensor[nn][xx][yy]= ΣΣΣ(k[mm][i][j]*inputTensor[mm][xx+i−of][yy+j−of]+ bias[nn]) 1×1 Conv, Σ represents the sum of mm=0 . . . m−1, i=0, and j=0, respectively. At this time, of =0 is set. In a case of 3×3 Conv, Σ represents the sum of mm=0 . . . m−1, i=0 . . . 2, j=0 . . . 2, respectively. At this time, of=1 is set. n is the number of channels of outSamples, m is the number of channels of inputTensor, width is the widths of inputTensor and outputTensor, and height is the heights of inputTensor and outputTensor. of is the size of a padding area provided around the inputTensor in order to make the size of the inputTensor equal to the size of the outputTensor. Hereinafter, in a case that the output of the NN filter unit is not an image but a value (corrected value), the output is represented by corrNN, instead of outputTensor.

Note that the following processing using inputTensor and outputTensor in the CHW format rather than inputTensor and outputTensor in the CWH format is equivalent to the processing hereinafter.

outputTensor[nn][yy][xx]=ΣΣΣ(k[mm][i][j]*inputTensor[mm][yy+j−of][xx+i−of]+bias[nn])

Processing represented by the following expression called Depthwise Cony may be performed. Where, nn=0, . . . n−1, xx=0, . . . width−1, and yy=0 . . . height−1.

outputTensor[nn][xx][yy]=ΣΣ(k[nn][i][j]*inputTensor[nn][xx+i−of][yy+j−of]+bias[nn])

Σ represents the sum for i and j. n is the number of channels of outputTensor and inputTensor, width is the widths of inputTensor and outputTensor, and height is the heights of inputTensor and outputTensor.

For non-linear processing called Activate, for example, ReLU may be used.

ReLU(x)=x>=0?x:0 leakyReLU represented by the following expression may also be used.

leakyReLU(x)=x>=0?x:a*x

Here, a is a predetermined value, for example, 0.1 or 0.125. In order to perform an integer operation, all the values of k, bias, and a may be set to integers, and a right shift may be performed after cony.

In the ReLU, 0 is output for a value less than 0 at all times, and the input value is output for a value equal to or greater than 0. On the other hand, in the leakyReLU, linear processing is performed for values less than 0 with the gradient set equal to a. In the ReLU, since a gradient for a value less than 0 disappears, there is a case that it may be difficult to proceed with learning. In the leakyReLU, a gradient for values less than 0 is left, which makes the problem less likely to occur. In the leakyReLU(x), PReLU in which the value of a is parameterized for use may be used.

NNR

Neural Network Coding and Representation (NNR) is an international standard for efficiently compressing a neural network (NN). By compressing the trained NN, efficiency in storing and transmitting the NN can be improved.

An outline of coding and decoding processing of NNR will be described below.

Figure 20:
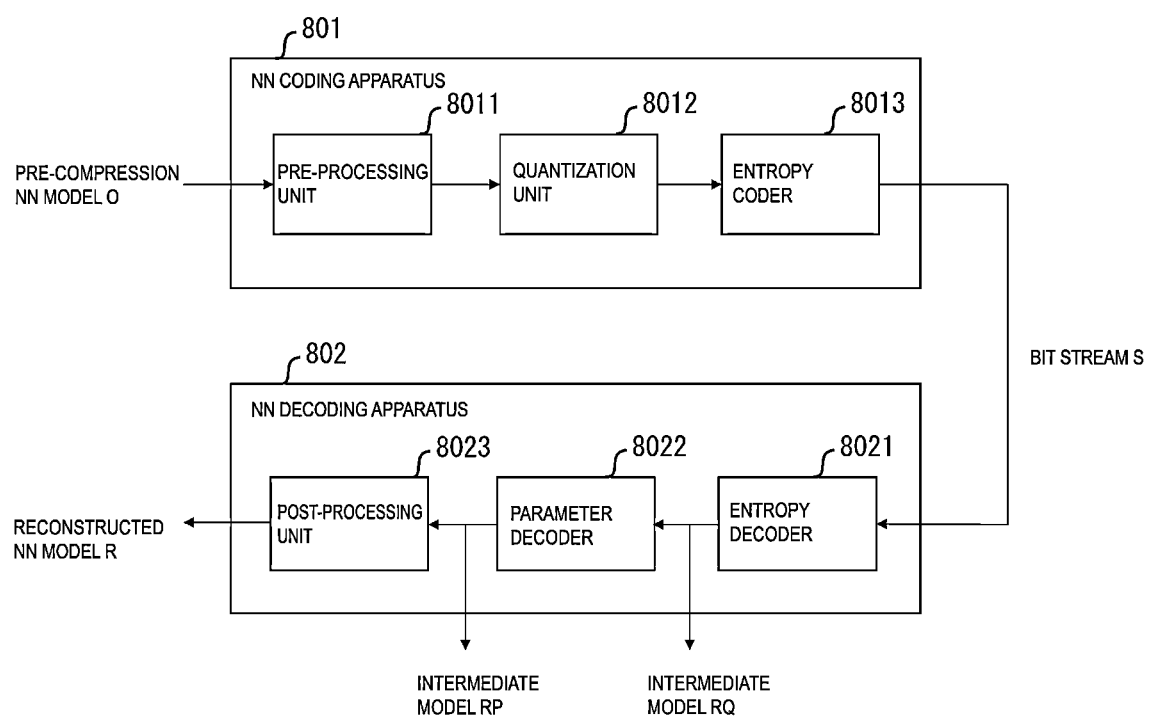
FIG. 20 is a diagram illustrating a coding apparatus and a decoding apparatus of NNR.

FIG. 20 is a diagram illustrating a coding apparatus and a decoding apparatus of NNR.

A NN coding apparatus 801 includes a pre-processing unit 8011, a quantization unit 8012, and an entropy coder 8013. The NN coding apparatus 801 receives an input of a pre-compression NN model O, and the quantization unit 8012 quantizes the NN model O to obtain a quantized model Q. The NN coding apparatus 801 may repeatedly apply a parameter reduction method such as pruning or sparsifying with the pre-processing unit 8011 before quantization. After that, the entropy coder 8013 applies entropy coding to the quantization model Q to obtain a bit stream S for storing and transmitting the NN model.

The NN decoding apparatus 802 includes an entropy decoder 8021, a parameter reconstruction unit 8022, and a post-processing unit 8023. The NN decoding apparatus 802 receives an input of a bit stream S transmitted first, and the entropy decoder 8021 performs entropy decoding on the bit stream S to obtain an intermediate model RQ. In a case that the operating environment of the NN model supports inference using the quantized representation used in RQ, the RQ may be output and used for inference. Otherwise, the parameter reconstruction unit 8022 reconstructs the parameters of RQ to the original representation to obtain an intermediate model RP. In a case that the sparse tensor representation to be used can be processed in the operation environment of the NN model, RP may be output and used for inference. Otherwise, a reconstructed NN model R that does not include a tensor or a structural representation unlike the NN model O is obtained and output.

In the NNR standard, there are decoding techniques for numerical representations of specific NN parameters, such as integers, floating points, and the like.

The decoding method NNR_PT_INT decodes a model including parameters of an integer value. The decoding method NNR_PT_FLOAT extends NNR_PT_INT and a quantization step size delta is added. The delta is multiplied by the integer value to produce a scaled integer. delta is derived from an integer quantization parameter qp and a granularity parameter of delta qp_density as follows.

$$mul = 2\hat{}(qp\_density) + (qp\&(2\hat{}(qp\_density)-1))$$

$$delta = mul * 2\hat{}((qp>>qp\_density) - qp\_density)$$

Format of Trained NN

The representation of the trained NN consists of two elements: a topological representation such as the size of a layer and connections between layers, and a parametric representation such as weights and biases.

Although the topology representation is covered by a native format such as Tensorflow and PyTorch, there are exchange formats such as Open Neural Network Exchange Format (ONNX), Neural Network Exchange Format (NNEF), and the like to improve interoperability.

According to the NNR standard, topology information nnr_topology_unit_payload is transmitted as part of an NNR bit stream containing compressed parameter tensors. Thus, inter-operations with the topology information expressed not only in the exchange format but also in the native format are achieved.

Configuration of Image Coding Apparatus

Figure 7:
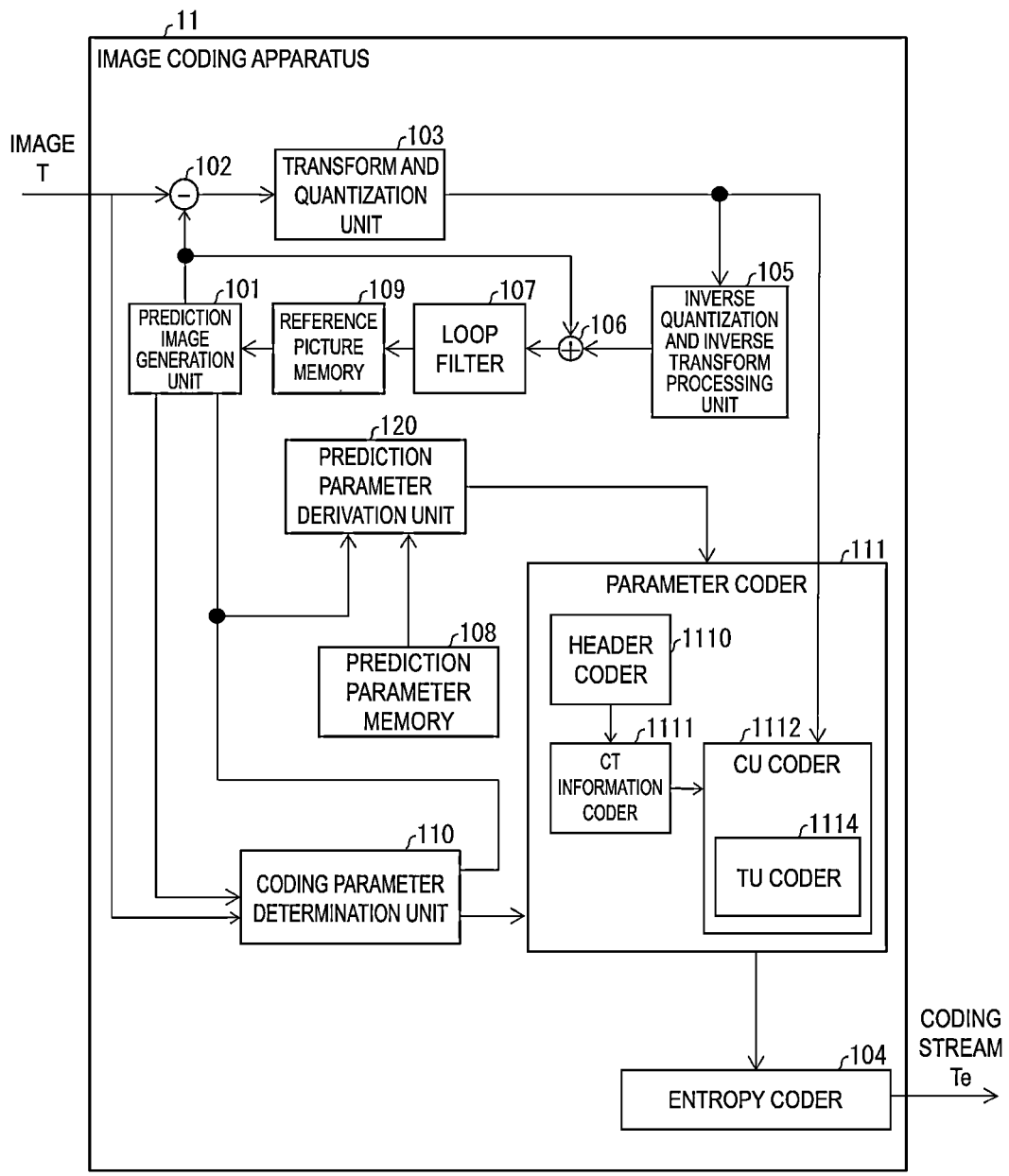
FIG. 7 is a block diagram illustrating a configuration of an image coding apparatus.

Next, a configuration of the image coding apparatus 11 according to the present embodiment will be described. FIG. 7 is a block diagram illustrating a configuration of the image coding apparatus 11 according to the present embodiment. The image coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit or a frame memory) 108, a reference picture memory (a reference image storage unit or a frame memory) 109, a coding parameter determination unit 110, a parameter coder 111, a prediction parameter derivation unit 120, and an entropy coder 104.

The prediction image generation unit 101 generates a prediction image for each CU. The prediction image generation unit 101 includes the inter prediction image generation unit 309 and intra prediction image generation unit 310 already described, and description of these units is omitted.

The subtraction unit 102 subtracts, from the pixel value of an image T, a pixel value of the prediction image of a block input from the prediction image generation unit 101 to generate a prediction error. The subtraction unit 102 outputs the prediction error to the transform and quantization unit 103.

The transform and quantization unit 103 performs frequency transform on the prediction error input from the subtraction unit 102 to calculate a transform coefficient, and derives a quantization transform coefficient through quantization. The transform and quantization unit 103 outputs the quantization transform coefficient to the parameter coder 111 and the inverse quantization and inverse transform processing unit 105.

The inverse quantization and inverse transform processing unit 105 is the same as the inverse quantization and inverse transform processing unit 311 (FIG. 5) of the image decoding apparatus 31, and description thereof is omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. A general operation of each module will be described below.

The header coder 1110 performs coding processing of parameters such as header information, split information, prediction information, and quantization transform coefficients.

The CT information coder 1111 codes QT and MT (BT and TT) split information and the like.

The CU coder 1112 codes the CU information, the prediction information, the split information, and the like.

In a case that a prediction error is included in the TU, the TU coder 1114 codes QP update information and a quantization prediction error.

The CT information coder 1111 and the CU coder 1112 supplies, to the parameter coder 111, syntax elements such as inter prediction parameters (predMode, merge_flag, merge_idx, inter_pred_idc, refIdxLX, mvp_LX_idx, and mvdLX), intra prediction parameters (intra_luma_mpm_flag, intra_luma_mpm_idx, intra_luma_mpm_reminder, and intra_chroma_pred_mode), and the quantization transform coefficients.

The parameter coder 111 inputs the quantization transform coefficients and the coding parameters (split information and prediction parameters) to the entropy coder 104. The entropy coder 104 entropy codes the quantization transform coefficients and the coding parameters to generate coded data Te and outputs the coded data Te.

The prediction parameter derivation unit 120 is a unit including the inter prediction parameter coder 112 and the intra prediction parameter coder 113, and derives an inter prediction parameter and an intra prediction parameter from the parameters input from the coding parameter determination unit 110. The derived inter prediction parameter and intra prediction parameter are output to the parameter coder 111.

Configuration of Inter Prediction Parameter Coder

Figure 8:
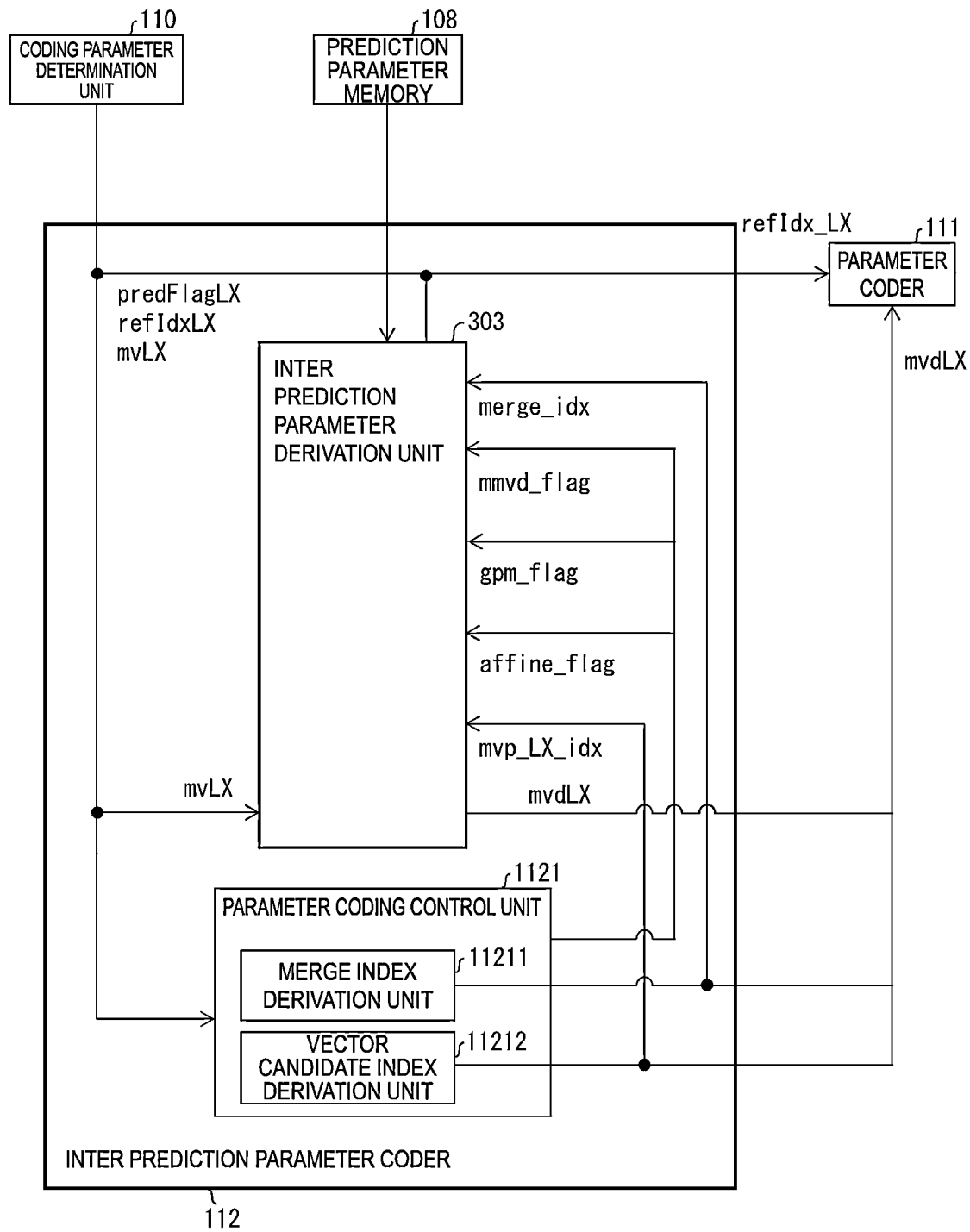
FIG. 8 is a schematic diagram illustrating a configuration of an inter prediction parameter coder.

The inter prediction parameter coder 112 includes a parameter coding control unit 1121 and the inter prediction parameter derivation unit 303 as illustrated in FIG. 8. The inter prediction parameter derivation unit 303 has a configuration identical to that of the image decoding apparatus. The parameter coding control unit 1121 includes a merge index derivation unit 11211 and a vector candidate index derivation unit 11212.

The merge index derivation unit 11211 derives merge candidates and the like, and outputs the merge candidates and the like to the inter prediction parameter derivation unit 303. The vector candidate index derivation unit 11212 derives prediction vector candidates and the like, and outputs the prediction vector candidates and the like to the inter prediction parameter derivation unit 303 and the parameter coder 111.

Configuration of Intra Prediction Parameter Coder 113

The intra prediction parameter coder 113 includes a parameter coding control unit 1131 and the intra prediction parameter derivation unit 304. The intra prediction parameter derivation unit 304 has a configuration identical to that of the image decoding apparatus.

The parameter coding control unit 1131 derives IntraPredModeY and IntraPredModeC. Furthermore, intra_luma_mpm_flag is determined with reference to mpmCandList[ ]. These prediction parameters are output to the intra prediction parameter derivation unit 304 and the parameter coder 111.

However, unlike in the image decoding apparatus, the coding parameter determination unit 110 and the prediction parameter memory 108 provide input to the inter prediction parameter derivation unit 303 and the intra prediction parameter derivation unit 304, and the input is output to the parameter coder 111.

The addition unit 106 adds the pixel value of the prediction block input from the prediction image generation unit 101 and a prediction error input from the inverse quantization and inverse transform processing unit 105 together for each pixel, thereby generating a decoded picture. The addition unit 106 stores the generated decoded picture in the reference picture memory 109.

The loop filter 107 applies a deblocking filter, an SAO, and an ALF to the decoded picture generated by the addition unit 106. Note that the loop filter 107 need not necessarily include the above-described three types of filters, and may also have only the deblocking filter, for example.

The prediction parameter memory 108 stores the prediction parameters generated by the coding parameter determination unit 110 for each target picture and CU at a predetermined location.

The reference picture memory 109 stores the decoded picture generated by the loop filter 107 for each target picture and CU at a predetermined location.

The coding parameter determination unit 110 selects one set among multiple sets of coding parameters. The coding parameters include QT, BT, or TT split information described above, a prediction parameter, or a parameter to be coded which is generated in association therewith. The prediction image generation unit 101 generates a prediction image by using these coding parameters.

The coding parameter determination unit 110 calculates, for each of the multiple sets, an RD cost value indicating the size of the amount of information and a coding error. The RD cost value is, for example, the sum of a code amount and the value obtained by multiplying a coefficient 2 by a square error. The code amount is an amount of information of the coded data Te obtained by performing entropy coding on a quantization error and coding parameters. The square error is the square sum of the prediction errors calculated by the subtraction unit 102. The coefficient 2 is a real number greater than a preset zero. The coding parameter determination unit 110 selects a set of coding parameters of which the calculated cost value is the minimum value. The coding parameter determination unit 110 outputs the determined coding parameters to the parameter coder 111 and the prediction parameter derivation unit 120.

Note that a computer may be used to implement some of the image coding apparatus 11 and the image decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction parameter derivation unit 320, the prediction image generation unit 101, the subtraction unit 102, the transform and quantization unit 103, the entropy coder 104, the inverse quantization and inverse transform processing unit 105, the loop filter 107, the coding parameter determination unit 110, a parameter coder 111, and the prediction parameter derivation unit 120. In that case, this configuration may be achieved by recording a program for implementing such control functions on a computer-readable recording medium and causing a computer system to read and perform the program recorded on the recording medium. Note that the "computer system" mentioned here refers to a computer system built into either the image coding apparatus 11 or the image decoding apparatus 31 and is assumed to include an OS and hardware components such as peripheral equipment. The "computer-readable recording medium" refers to a portable medium such as a flexible disk, a magneto-optical disc, a ROM, or a CD-ROM, and a storage device such as a hard disk built into the computer system. The "computer-readable recording medium" may include a medium that dynamically stores a program for a short period of time, such as a communication line in a case that the program is transmitted over a network such as the Internet or over a communication line such as a telephone line, and may also include a medium that stores the program for a fixed period of time, such as a volatile memory included in the computer system functioning as a server or a client in such a case. The above-described program may be one for implementing some of the above-described functions, and may also be one capable of implementing the above-described functions in combination with a program already recorded in the computer system.

Some or all of the image coding apparatus 11 and the image decoding apparatus 31 in the embodiments described above may be achieved as an integrated circuit such as a large scale integration (LSI) circuit. Each functional block of the image coding apparatus 11 and the image decoding apparatus 31 may be made into an individual processor, or some or all of the functional blocks may be integrated into a processor. The circuit integration method is not limited to LSI, and integration may be achieved with a dedicated circuit or a multi-purpose processor. In a case that an integrated circuit technology that replaces LSI appears as a result of advancement of semiconductor technology, an integrated circuit based on the technology may be used.

Although the embodiments of the present invention have been described in detail above referring to the drawings, a specific configuration is not limited to the above embodiments and various amendments can be made to a design as long as they fall within the scope that does not depart from the gist of the present invention.

To describe the present embodiment based on FIG. 1, provided is a video decoding apparatus including an image decoding apparatus configured to decode coded data to generate a decoded picture, and a resolution inverse conversion apparatus configured to use a neural network for converting the decoded picture to have an indicated resolution by using inverse conversion information, in which the resolution inverse conversion apparatus decodes information indicating a resolution and information representing a unit of inverse conversion processing, and a value of the information indicating the resolution and a value of the information representing the unit of the inverse conversion processing are equally proportional.

Provided is a video decoding apparatus including an image decoding apparatus configured to decode coded data to generate a decoded picture, and a resolution inverse conversion apparatus configured to use a neural network for converting the decoded picture to have an indicated resolution by using inverse conversion information, in which a pixel value of an image and a value of input/output of a tensor are converted into each other by using a data type of a value of an input tensor and a value of an output tensor of the neural network of the resolution inverse conversion apparatus and a bit-depth of a pixel value of the decoded picture.

Provided is a video coding apparatus including an image coding apparatus configured to code an image to generate coded data, an inverse conversion information generation apparatus configured to generate inverse conversion information for inversely converting a resolution of a decoded picture obtained by decoding the coded data, and an inverse conversion information coding apparatus configured to code the inverse conversion information as supplemental enhancement information, in which the inverse conversion information generation apparatus generates inverse conversion information in which a value of information indicating a resolution and a value of information representing a unit of inverse conversion processing are equally proportional.

Provided is a video coding apparatus including an image coding apparatus configured to code an image to generate coded data, an inverse conversion information generation apparatus configured to generate inverse conversion information for inversely converting a resolution of a decoded picture obtained by decoding the coded data, and an inverse conversion information coding apparatus configured to code the inverse conversion information as supplemental enhancement information, in which inverse conversion information for converting a pixel value of an image and a value of input/output of a tensor into each other is generated by using a data type of a value of an input tensor and a value of an output tensor of a neural network of the resolution inverse conversion apparatus and a bit-depth of a pixel value of a coded image.

An embodiment of the present invention is not limited to the above-described embodiments, and various modifications are possible within the scope of the claims. That is, an embodiment obtained by combining technical means modified appropriately within the scope of the claims is also included in the technical scope of the present invention.

INDUSTRIAL APPLICABILITY

The embodiment of the present invention can be preferably applied to a video decoding apparatus that decodes coded data in which image data is coded, and a video coding apparatus that generates coded data in which image data is coded. In addition, the embodiment of the present invention can be preferably applied to a data structure of coded data generated by the video coding apparatus and referred to by the video decoding apparatus.

A video decoding apparatus according to an aspect of the present invention includes an image decoding apparatus configured to decode coded data to generate a decoded image (picture), and a resolution inverse conversion apparatus configured to use a neural network for converting the decoded picture to have an indicated resolution by using inverse conversion information, in which the resolution inverse conversion apparatus decodes information indicating a resolution and information representing a unit of inverse conversion processing, and a value of the information indicating the resolution and a value of the information representing the unit of the inverse conversion processing are equally proportional.

A video decoding apparatus according to an aspect of the present invention includes an image decoding apparatus configured to decode coded data to generate a decoded image (picture), and a resolution inverse conversion apparatus configured to use a neural network for converting the decoded picture to have an indicated resolution by using inverse conversion information, in which a pixel value of an image and a value of input/output of a tensor are converted into each other by using a data type of a value of an input tensor and a value of an output tensor of the neural network of the resolution inverse conversion apparatus and a bit-depth of a pixel value of the decoded picture.

A video coding apparatus according to an aspect of the present invention includes an image coding apparatus configured to code an image (picture) to generate coded data, an inverse conversion information generation apparatus configured to generate inverse conversion information for inversely converting a resolution of a decoded picture obtained by decoding the coded data, and an inverse conversion information coding apparatus configured to code the inverse conversion information as supplemental enhancement information, in which the inverse conversion information generation apparatus generates inverse conversion information in which a value of information indicating a resolution and a value of information representing a unit of inverse conversion processing are equally proportional.

A video coding apparatus according to an aspect of the present invention includes an image coding apparatus configured to code an image (picture) to generate coded data, an inverse conversion information generation apparatus configured to generate inverse conversion information for inversely converting a resolution of a decoded picture obtained by decoding the coded data, and an inverse conversion information coding apparatus configured to code the inverse conversion information as supplemental enhancement information, in which inverse conversion information for converting a pixel value of an image and a value of input/output of a tensor into each other is generated by using a data type of a value of an input tensor and a value of an output tensor of a neural network of the resolution inverse conversion apparatus and a bit-depth of a pixel value of a coded image.

REFERENCE SIGNS LIST

1 Video transmission system
30 Video decoding apparatus
31 Image decoding apparatus
301 Entropy decoder
302 Parameter decoder
303 Inter prediction parameter derivation unit
304 Intra prediction parameter derivation unit
305, 107 Loop filter
306, 109 Reference picture memory
307, 108 Prediction parameter memory
308, 101 Prediction image generation unit
309 Inter prediction image generation unit
310 Intra prediction image generation unit
311, 105 Inverse quantization and inverse transform processing unit
312, 106 Addition unit
320 Prediction parameter derivation unit
10 Video coding apparatus
11 Image coding apparatus
102 Subtraction unit
103 Transform and quantization unit
104 Entropy coder
110 Coding parameter determination unit
111 Parameter coder
112 Inter prediction parameter coder
113 Intra prediction parameter coder
120 Prediction parameter derivation unit
71 Inverse conversion information creation apparatus
81 Inverse conversion information coding apparatus
91 Inverse conversion information decoding apparatus
611 NN filter unit

The invention claimed is:

1. A video decoding apparatus for generating a decoded picture by decoding coded data, the video decoding apparatus comprising:
resolution inverse conversion circuit that performs a post-filtering by using a neural network specified by resolution conversion information; and neural network filter circuit that derives:
(i) first information relating to a size of a picture,
(ii) second information specifying a size of a picture resulting from applying the post-filtering,
(iii) third information indicating a patch size for the post-filtering, and
(iv) fourth information for output patch derived by using the third information,
wherein
a product of a value of the first information and a value of the fourth information is equal to a product of a value of the second information and a value of the third information.

2. A video encoding apparatus for generating an encoded picture by encoding image data, the video encoding apparatus comprising:
resolution inverse conversion circuit that performs a post-filtering by using a neural network specified by resolution conversion information; and
neural network filter circuit that derives:
(i) first information relating to a size of a picture,
(ii) second information specifying a size of a picture resulting from applying the post-filtering,
(iii) third information indicating a patch size for the post-filtering, and
(iv) fourth information for output patch derived by using the third information,
wherein
a product of a value of the first information and a value of the fourth information is equal to a product of a value of the second information and a value of the third information.

3. A video decoding method for generating a decoded picture by decoding coded data, the video decoding method including:
performing a post-filtering by using a neural network specified by resolution conversion information; and
deriving (i) first information relating to a size of a picture, (ii) second information specifying a size of a picture resulting from applying the post-filtering, (iii) third information indicating a patch size for the post-filtering, and (iv) fourth information for output patch derived by using the third information,
wherein
a product of a value of the first information and a value of the fourth information is equal to a product of a value of the second information and a value of the third information.

\* \* \* \* \*